(12) United States Patent
Luk et al.

(10) Patent No.: US 9,729,915 B2
(45) Date of Patent: Aug. 8, 2017

(54) DETECTING USER DEVICES TO DETERMINE STATE OF WATCHED SHOW

(71) Applicant: PAYPAL, INC., San Jose, CA (US)

(72) Inventors: Bryant Genepang Luk, Round Rock, TX (US); Christopher Diebold O'Toole, Cedar Park, TX (US); Richard Chapman Bates, Austin, TX (US); Robert He, Pflugerville, TX (US)

(73) Assignee: PAYPAL, INC., San Jose, CA (US)

(*) Notice: Subject to any disclaimer, the term of this patent is extended or adjusted under 35 U.S.C. 154(b) by 10 days.

(21) Appl. No.: 14/530,603

(22) Filed: Oct. 31, 2014

(65) Prior Publication Data

US 2016/0127766 A1 May 5, 2016

(51) Int. Cl.
*H04N 21/4335* (2011.01)
*H04N 21/4147* (2011.01)
*H04N 21/81* (2011.01)
*H04N 21/45* (2011.01)
*H04N 21/442* (2011.01)
*G11B 21/00* (2006.01)
*H04N 21/41* (2011.01)
*H04N 21/433* (2011.01)
(Continued)

(52) U.S. Cl.
CPC ....... *H04N 21/4335* (2013.01); *G11B 27/005* (2013.01); *H04N 21/4104* (2013.01); *H04N 21/4147* (2013.01); *H04N 21/4334* (2013.01); *H04N 21/441* (2013.01); *H04N 21/44204* (2013.01); *H04N 21/44222* (2013.01); *H04N 21/4532* (2013.01); *H04N 21/4542* (2013.01); *H04N 21/812* (2013.01)

(58) Field of Classification Search
CPC ......... H04N 21/23113; H04N 21/4104; H04N 21/4147; H04N 21/4334; H04N 21/4335; H04N 21/441; H04N 21/44204; H04N 21/44222; H04N 21/4532; H04N 21/4542; H04N 21/812; G11B 27/005
See application file for complete search history.

(56) References Cited

U.S. PATENT DOCUMENTS

2003/0149988 A1* 8/2003 Ellis .................. H04N 5/44543
  725/87
2004/0244030 A1* 12/2004 Boyce ................. G11B 19/025
  725/25

(Continued)

*Primary Examiner* — Gelek W Topgyal
(74) *Attorney, Agent, or Firm* — Haynes and Boone, LLP

(57) ABSTRACT

Devices, systems, and methods for detecting user devices to determine a state of a watched show are provided. A digital video recorder (DVR) is configured to store a media file associated with a media program. The DVR detects one or more user devices within a predetermined vicinity while the media program is being played. The DVR identifies users who are interested in the media program. The DVR tracks a watch status associated with the media program indicating which users have watched or are watching the media program based on the detected user devices. For stored media files, the DVR determines whether to delete the media file based on whether all users who are interested in the media program have completed watching the media program. The DVR may track user activity and/or vital signs based on sensor data from wearable devices, for example, to determine user reaction and/or user interests.

20 Claims, 13 Drawing Sheets

(51) Int. Cl.
  *H04N 21/441* (2011.01)
  *H04N 21/454* (2011.01)
  *G11B 27/00* (2006.01)

(56) References Cited

U.S. PATENT DOCUMENTS

| | | | |
|---|---|---|---|
| 2006/0136496 A1* | 6/2006 | Ohashi | H04N 7/163 |
| 2007/0033607 A1* | 2/2007 | Bryan | H04H 60/27 |
| | | | 725/10 |
| 2007/0157242 A1* | 7/2007 | Cordray | H04H 60/33 |
| | | | 725/46 |
| 2009/0290856 A1 | 11/2009 | Mccarthy et al. | |
| 2010/0263004 A1* | 10/2010 | Barton | G11B 27/3081 |
| | | | 725/106 |
| 2011/0026904 A1* | 2/2011 | McAuley | H04N 5/76 |
| | | | 386/297 |
| 2011/0030018 A1* | 2/2011 | Mizuno | H04N 5/76 |
| | | | 725/88 |
| 2011/0135281 A1 | 6/2011 | Meare | |
| 2012/0060176 A1* | 3/2012 | Chai | H04H 60/45 |
| | | | 725/10 |
| 2012/0131631 A1 | 5/2012 | Bhogal et al. | |
| 2013/0139193 A1* | 5/2013 | Fan | H04N 7/157 |
| | | | 725/14 |
| 2013/0251348 A1 | 9/2013 | Barton et al. | |
| 2013/0298146 A1* | 11/2013 | Conrad | H04N 21/252 |
| | | | 725/12 |
| 2013/0298158 A1* | 11/2013 | Conrad | G06Q 30/02 |
| | | | 725/34 |
| 2014/0047467 A1* | 2/2014 | Arling | H04N 21/42204 |
| | | | 725/14 |
| 2014/0168071 A1* | 6/2014 | Ahmed | H04N 5/23206 |
| | | | 345/156 |
| 2014/0223461 A1 | 8/2014 | Hatambeiki et al. | |
| 2014/0250447 A1* | 9/2014 | Schink | H04N 21/44218 |
| | | | 725/10 |
| 2015/0121428 A1* | 4/2015 | Nguyen | H04N 21/43615 |
| | | | 725/47 |

* cited by examiner

DETECTING USER DEVICES TO DETERMINE STATE OF WATCHED SHOW

BACKGROUND

Field of the Invention

The present invention relates to digital video recorders and detection of user devices.

Related Art

Digital video recorders (DVRs) have made it easier for users to record and watch media programs (e.g., movies, television shows, documentary films, or other programs) after they have been broadcasted. The amount of recorded programs that a DVR is capable of storing is typically limited by the amount of storage space on the DVR.

A DVR at a home may be used by a plurality of users, for example, family members or roommates. One or more users may be interested in a show recorded on the DVR. However, the DVR may automatically delete the show before all the users interested in the show have watched the show, such as when there is little storage space left, a user may delete a show after watching it even though others have not watched the show, or a user may leave a show saved for others even though others have watched the show and the show no longer needs to be saved, resulting in wasted storage space, all of which can be inconvenient for the users.

Figure 1:
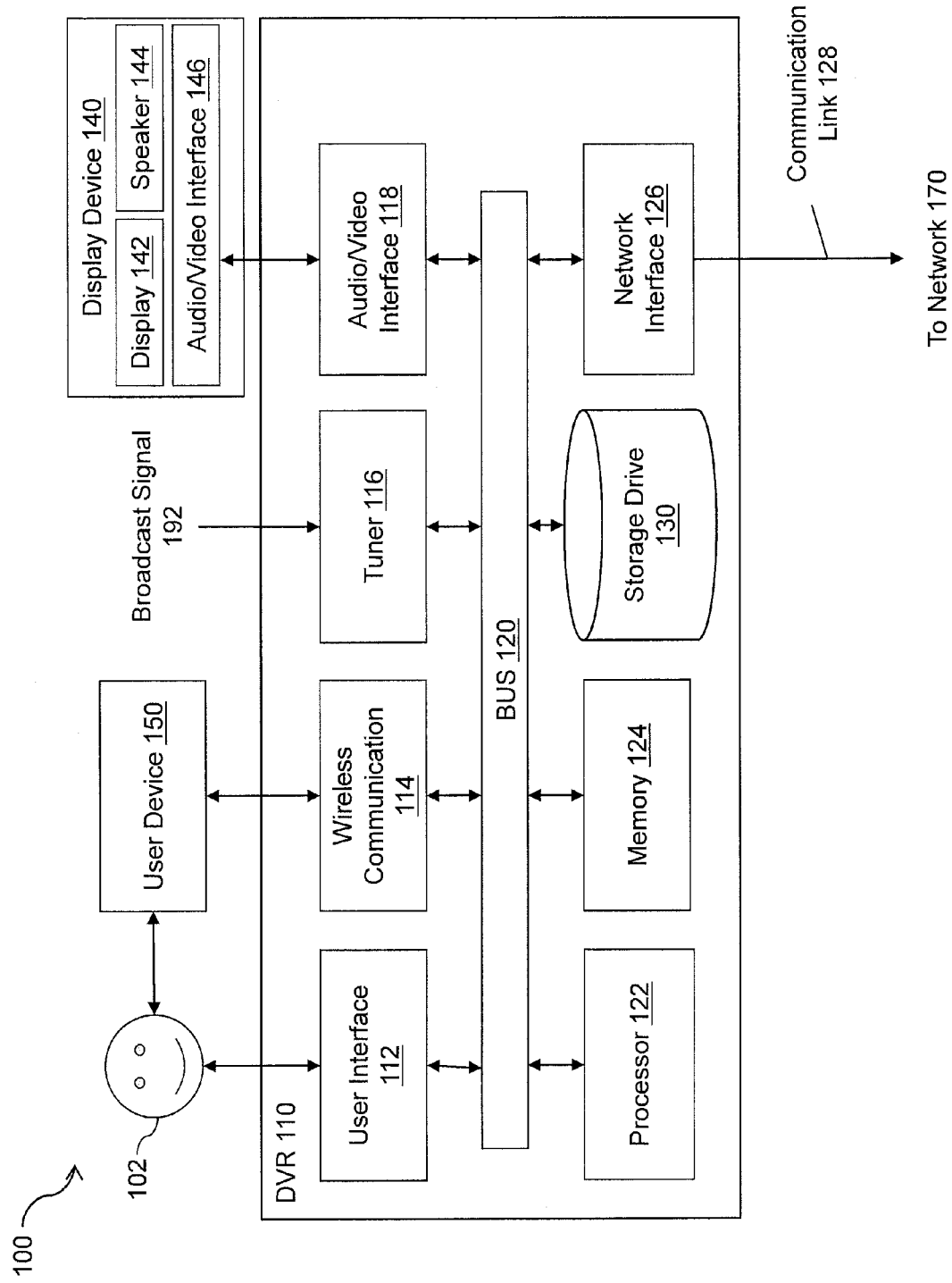
FIG. 1 is a block diagram illustrating a hardware environment supporting a DVR configured to detect user devices according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides devices, systems, and methods for detecting user devices to determine a state of a watched show.

A DVR may be a device or system configured to store a media file associated with a media program, and keep track of who has watched the media program by detecting user devices, such as wearable devices, near the DVR when the media program is being played on a display device (e.g., a television). The DVR may include a standalone DVR device or other device with DVR functionality (e.g., a set top box, a television (TV) or smart TV, a gaming console, etc.).

In various embodiments, while the media program is playing on the display device, the DVR detects one or more user devices within a predetermined vicinity using a wireless communication module or circuit. The DVR identifies users who are interested in watching the media program, i.e., interested users, by accessing user interest data in a hardware memory of the DVR. The DVR tracks the state of a watched media program, e.g., a watch status, associated with the media program indicating which users have watched or are watching the media program based on the detected user devices.

In an embodiment, in cases in which the media program has been stored as a media file on the storage drive of the DVR, the DVR determines whether to delete the media file based on whether all interested users have completed watching the media program. The DVR may determine whether to delete further based on the amount of available space on the storage drive.

In other embodiments, in cases in which the media program is currently broadcasting and has not been stored as a media file on the storage drive, the DVR determines whether to store the media program based on whether all interested users are currently watching the media program. The DVR may determine whether to store the media program further based on the amount of storage space on the storage drive. If all the interested users are watching the media program while it is being broadcast, storing the media program on the storage drive may unnecessarily take up space given that interested users are unlikely to rewatch media programs. If it is known that one or more interested users have rewatched similar or related media programs in the past, the DVR may decide to store the media program even if all interested users are watching the broadcast.

In a further embodiment, the DVR only allows playback when all interested users are present. For example, a group of users may want to watch a media program together, and set the media program to play only when all members of the group are all present.

In various embodiments, user interest data may be based on users registering in the DVR what programs each user is interested in, for example, via user input on the DVR or on a user device. User interest data may also be based on a record of what users have watched in the past, e.g., a watch history, that is tracked by the DVR. For example, if the DVR detects a user regularly watching episodes from a series, the DVR may determine that he or she is interested in other episodes from the series.

In an embodiment, if a user stops watching a media program before the program ends, the DVR can resume the media program at the point where the user last left off. For example, the DVR may detect 5 viewers watching a media program, and one of the viewers may leave in the middle while the other four watch the entire media program. When the media program is started again by the viewer who left in the middle, the DVR recognizes the viewer as such and starts where the viewer left off.

In other embodiments, the DVR may play specific advertisements based on the detected user devices. In an example, the DVR may play advertisements for one user and skip advertisements for other users based on the detected user devices. In another example, the DVR may target advertisements to specific users based on the detected user devices and the interests of the users.

In further embodiments, the DVR receives sensor data measured by sensors in user devices, which may indicate activity (e.g., what they are doing), vital signs (e.g., pulse), and other personal metrics while users watch media programs or advertisements. The DVR may transmit personal metric data, which may include sensor data and other personal metric data generated by processing sensor data, to a service provider server.

The service provider server may determine interests of a user and provide services based on the user's excitement and/or reaction to a scene of a media program or an advertisement. For example, if the user was excited by a certain type of scene, the service provider server may recommend media programs with similar types of scenes. In another example, the service provider server may provide the user with offers for movies, events, or products based on the determined interests of the user (e.g., offers for movies/events/products related to a scene that excited the user).

In certain embodiments, when the DVR detects that a certain user is watching a media program, the DVR skips, fast-forwards, and/or gives warning of certain scenes. Users may provide user information indicating one or more scene types to avoid for a certain user. When the DVR detects the certain user and determines a scene corresponding to the one or more scene types to avoid for the certain user is playing or about to be played, the DVR may skip, fast-forward, and/or give warning. For example, parents of a child may have provided user information associated with the child indicating that violent scenes are to be skipped. When the DVR detects the child watching, the DVR skips violent scenes.

Referring now to FIG. 1, a block diagram of a hardware environment of an exemplary DVR 110 is illustrated. DVR 110 may be a device or system with media content recording functionality. For example, DVR 110 may be a DVR device, another device with media content recording functionality (e.g., set-top box, TV, smart TV, computing device, game console, etc.) with media content recording functionality, or a DVR system with media content recording functionality that includes a plurality of devices and/or components. DVR 110 may include a bus 120 or other communication mechanism for communicating data, which interconnects subsystems and components, including a user interface 112, a wireless communication circuit 114, a tuner or receiver 116, an audio/video (A/V) interface 118 (or alternatively, a display component if DVR 110 is integrated with a display, e.g., a television with DVR functionality), one or more processing component 122 (e.g., processor, micro-controller, digital signal processor (DSP), etc.), a system memory component 124 (e.g., RAM), a storage drive 130 (e.g., a static storage drive such as ROM), and a network interface circuit 126. In some embodiments, DVR 110 may also include an encoder component and a decoder component to perform functions such as encoding and decoding analogue media signals to and from digital media signals.

A user 102 may interact with DVR 110 using user interface 112. User interface 112, in an embodiment, may include an input component, such as a remote control, a touch screen, a keyboard, or other input component. In an embodiment, user interface 112 includes a remote control. User 102 may provide input on the remote control, and the remote control may transmit the user input via infrared or near-infrared signals to the DVR 110. User interface 112 may provide a menu or settings on a display device 140, and user 102 may interact with the menu or settings using the remote control. In other embodiments, user interface 112 may be provided, at least in part, by a graphic user interface (GUI) provided on a user device 150.

Wireless communication circuit 114, in various embodiments, detects one or more user devices 150 in an area of interest, which may be a predetermined vicinity of DVR 110 or a viewing area from which users may view display device 140. Wireless communication circuit 114 may create a communication area in which user devices 150 are detected. The communication area may cover all or part of the area of interest. Accordingly, wireless communication circuit 114 may detect user devices 150 within a viewing distance of display device 140.

Wireless communication circuit 114 may receive identifier data packets from user devices 150. The identifier data packets include one or more user identifiers, which may be operating system registry entries, cookies associated with a user interface application, identifiers associated with hardware of user device 150, or various other appropriate identifiers. The user identifiers may be used to identify user device 150, user 102, or a user account associated with user device 150 or user 102. Wireless communication circuit 114 may further exchange data and information with user device 150.

Tuner or receiver 116, in various embodiments, receives media content signals from media content provider systems, such as broadcast signals 192 from television networks. Tuner 116 generates A/V signals based on the broadcast signals 192 and transmits the A/V signals to display device 140 via A/V interface 118. Tuner 116 may be, for example, an Advanced Television Systems Committee (ATSC) tuner (also called ATSC receiver, HDTV tuner, and HDTV receiver). Tuner 116 may perform one or more of selective tuning, demodulation, transport stream demultiplexing, decompression, error correction, A/V synchronization, and/or image reformatting. Selective tuning includes selecting a radio frequency for a television channel from a band of radio frequency signals that is received. Demodulation includes transforming the broadcast signals 192 to signals that may be used by display device 140 to produce audio and video output. Transport stream demultiplexing includes decoding a combined transport stream, in which multiple signals are combined, to its component signals. Decompression includes decompressing compressed digital data broadcasted from a television network. Error correction includes repairing errors in media content data. A/V synchronization includes coordinating the audio signals and the video signals so that they are displayed in sync. Image reformatting includes reformatting video signals so that it is optimal input for display device 140.

In accordance with embodiments of the present disclosure, DVR 110 performs specific operations by processor or processing component 122 executing one or more sequences of one or more instructions contained in system memory component 124. Such instructions may be read into system memory component 124 from another computer readable medium, such as storage drive 130. These may include instructions, for example, to access wireless communication circuit 114 to detect one or more user devices within predetermined vicinity, identify interested users for a media program by accessing user interest data on storage device 130, and track a watch status associated with the media program by maintaining watch status data on storage device 130. In other embodiments, hard-wired circuitry may be used in place of or in combination with software instructions for implementation of one or more embodiments of the disclosure.

In various embodiments, DVR 110 includes storage drive 130 configured to store one or more media program files. Storage drive 130 may also contain one or more databases for storing user data and information, such as personal information (e.g., user login, user's age, user's location, etc.), user account information, user interest data (e.g., programs that each user 102 is interested in), personal metric data (e.g., sensor data from sensors of user device 150), watch status data (e.g., tracking which users have watched a media program), and other user data and information. DVR 110 further includes network interface circuit 126 coupled to a network 170. DVR 110 may transmit and receive data, information, messages, and instructions, including one or more programs (e.g., application code), through network interface circuit 126 and communication link 128.

Display device 140, in various embodiments, includes a display 142, speakers 144, and an A/V interface 146. Display device 140 may be a television, a computing device, such as a notebook or tablet, or a system that includes a monitor and speakers. An integrated television device may provide display device 140 and at least a part of DVR 110. DVR 110 sends A/V signals for a media program to display device 140 via A/V interface 118 of DVR 110. Display device 140 receives the A/V signals via A/V interface 146 and plays the media program using display 142 and speakers 144.

Figure 2A:
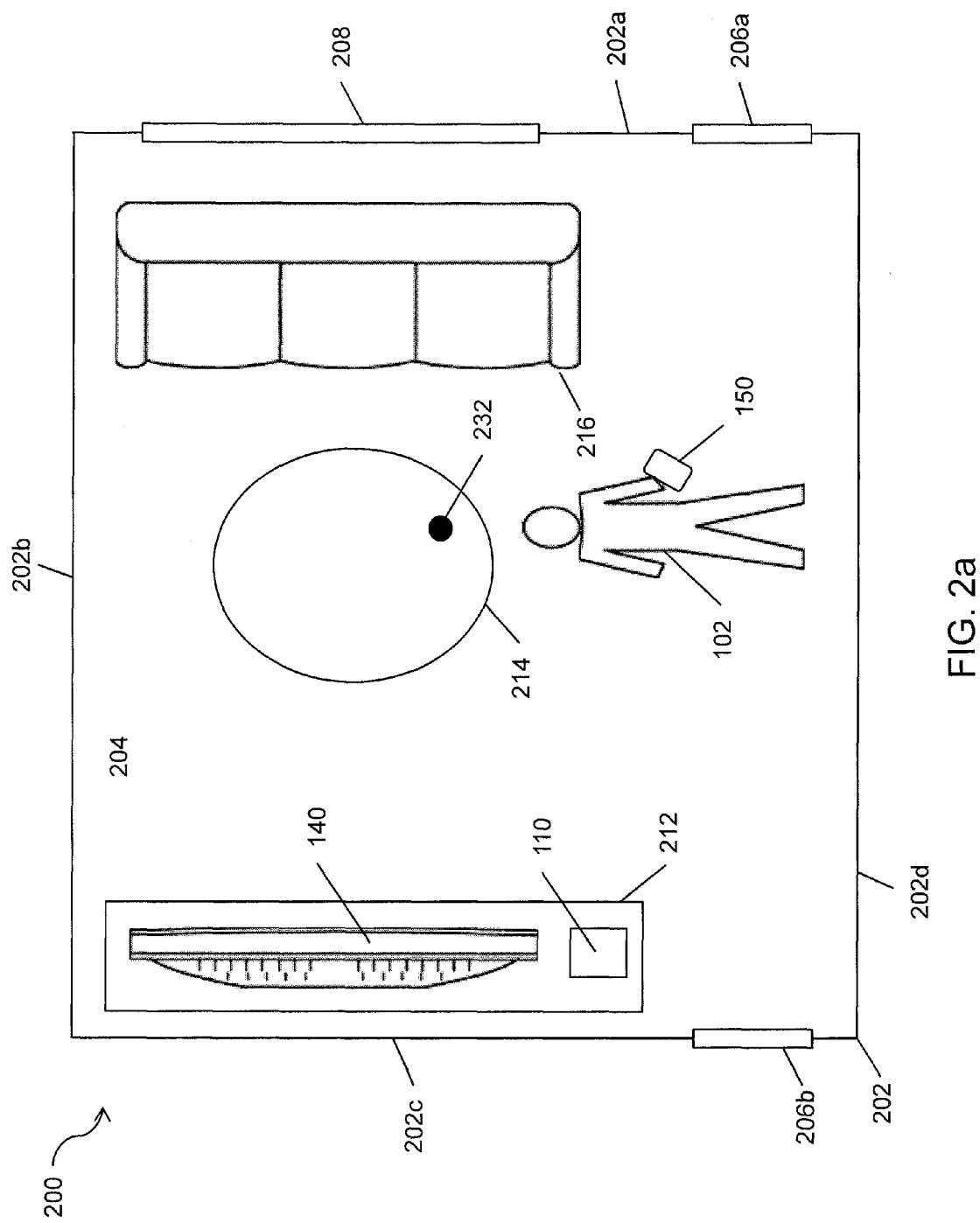
FIGS. 2a and 2b are schematic views illustrating a physical living room according to an embodiment of the present disclosure.

Referring now to FIG. 2a, an embodiment of a physical living room or entertainment room location 200 is illustrated. Physical room location 200 illustrated in FIG. 2a is provided as just one example of a location where users watch television programs, movies, and other media programs, and the DVR of the present disclosure will be beneficial for a wide variety of other types of locations. Physical room location 200 includes a living room or entertainment room 202 having a plurality of walls 202a, 202b, 202c, and 202d that define a physical room interior 204. The exterior wall 202a includes an exterior door 206a (e.g., a "front" door in the illustrated embodiment), an interior door 206b (e.g., a door to a hallway of the home), and an exterior window 208. In the illustrated embodiment, physical room interior 204 includes a TV stand 212, a table 214, a sofa 216, a beacon device 232, DVR 110, and display device 140. Further, physical room interior 204 may include user 102 with user device 150. One of skill in the art in possession of the present disclosure will recognize that the physical room location 200 is just one of a plurality of different types of locations (including other rooms, such as a bedroom, kitchen, dining room, etc.; and locations outside homes, such as an office, cafeteria, lounge, etc.) where the DVR devices, systems, and methods discussed in the present disclosure may be utilized while remaining within the scope of the present disclosure.

Figure 2B:
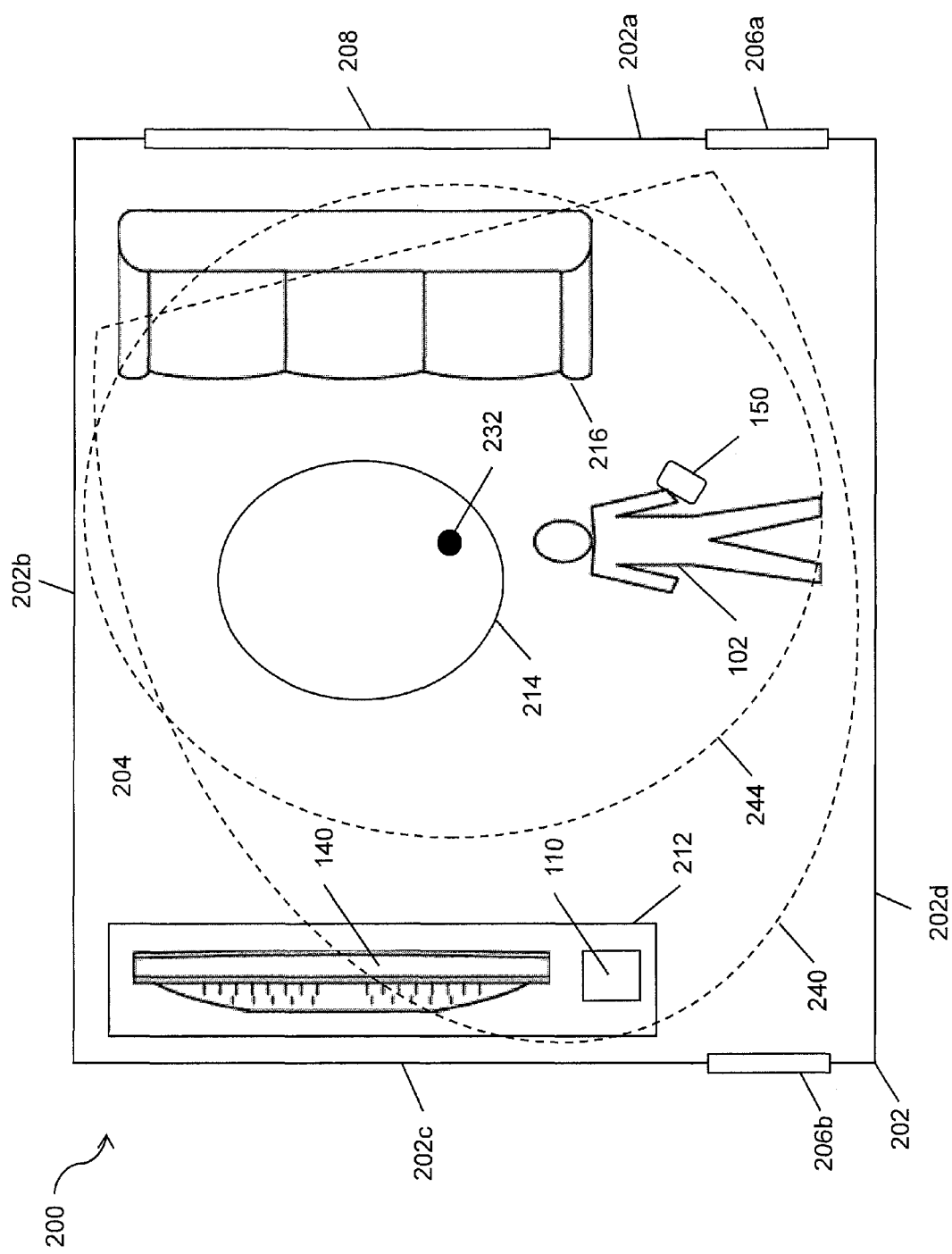

Referring now to FIG. 2b, an embodiment of a communication area 240 associated with DVR 110 and a communication area 244 associated with beacon 232 in physical room location 200 is illustrated.

DVR 110, in various embodiments, includes wireless communication circuit 114 configured to wirelessly communicate with user devices 150. DVR 110 creates communication area 240 with wireless communication circuit 114. DVR 110 may be positioned virtually anywhere in physical room location 200. For example, as can be seen in the illustrated embodiment, DVR 110 may be positioned next to display device 140.

DVR 110, in an embodiment, is configured to communicate with one or more user devices 150 within its communication area 240 (e.g., using wireless communication circuit 114) to detect user devices 150 within communication area 240, receive data from user devices 150, and send data to a service provider (e.g., using network interface circuit 126). For example, wireless communication circuit 114 may be a BLE communication device or a Wi-Fi communication device. However, other communication systems providing other communication areas are envisioned as falling within the scope of the present disclosure. One of skill in the art will recognize that the use of BLE communication devices for communication between wireless communication circuit 114 and user devices 150 may be utilized to provide for low power communication in the background of user devices 150 (e.g., when user devices 150 are not being actively used by users).

Communication area 240, in an embodiment, provides coverage for an area of interest, such as an area in the vicinity of DVR 110 or an area in which users may view media programs on display device 140. Wireless communication circuit 114 provides communication area 240 with a predetermined range or radius. The predetermined range may be capable of adjustment by the user. For example, the user may adjust the size of communication area 240, taking into account the room size or seating location in a living room. For example, a user may set the predetermined radius to a shorter distance (e.g., 3 feet) if DVR 110 is in a smaller room or is placed close to the seating area. In another example, a user may set the predetermined radius to a larger distance (e.g., 10 feet) if DVR 110 is in a larger room in which users may view media programs playing on display device 140 from anywhere in the room.

In an embodiment, the shape of communication area 240 is a symmetric circular shape radiating out from DVR 110. A symmetric communication area may be advantageous when DVR 110 is placed in the center of a room, for example, on or under table 214. In a further embodiment, the shape of communication area 240 created by DVR 110 is asymmetric, as illustrated in FIG. 2b. An asymmetric communication area may be created by configuring wireless communication circuit 114 to communicate signals from a certain direction or angle (e.g., signals from the front of DVR 110). For example, antenna techniques, such as beamforming, may be used to form constructive interference in areas of interest and form destructive interference in other areas. In another example, a parabolic or circular reflector or antenna may be placed on one side to focus the signal to the area of interest while reducing the signal strength behind the reflector or antenna. An asymmetric communication area may be advantageous when DVR 110 is placed next to a wall, for example, next to display device 140 on or in TV stand 212. In further embodiments, the shape of the communication area may be capable of being adjusted by the user to be a symmetric shape (e.g., a circular or spherical shape) or asymmetric (e.g., a triangular or cone shape). The direction of the asymmetric shape may also be capable of being adjusted such that DVR 110 may detect and receive communications from user devices in that direction. For example, DVR 110 may be able to select a symmetric or asymmetric shape and select the direction of the area of interest using a switch, knob, or via settings on user interface 112.

As an alternative or supplement to providing an asymmetric communication area, wireless communication circuit 114 may include a line-of-sight communication device that requires a line of sight (LOS) for communication, such as an infrared communication device (e.g., IrDA device) or a laser communication device. A line-of-sight communication device may be advantageously utilized because the line-of-sight communication device is able to detect and communicate only with user devices 150 within physical room location 200. Thus, it will not detect user device 150 if it is, for example, in the room next door because there is no visual LOS between the user device and DVR 110.

A DVR system may be provided with one or more beacon devices 232 placed in and/or around physical room location 200 as an alternative or supplement to wireless communication circuit 114 in DVR 110 that detects and communicates with user devices 150 in physical room location 200. In various embodiments, beacon devices 232 include a first communication system that wirelessly communicates with DVR 110, and a second communication system that creates a communication area 244 and wirelessly communicates with user devices 150 in communication area 244. One or more beacon devices 232 may be sized such that they may be inconspicuously positioned virtually anywhere in and/or around physical room location 200. For example, beacon devices 232 may be positioned on the ceiling, on the floor, or on wall 202*a-d* of physical room location 200. In the illustrated embodiment, beacon device 232 is positioned on table 214.

Beacon device 232, in an embodiment, is configured to communicate with one or more user devices 150 within its communication area 244 (e.g., using the second communication system) to detect user devices 150 within communication area, receive data from user devices 150, and send data to a service provider (e.g., using the first communication system) as discussed below. For example, the second communication system in beacon device 232 may be a BLE communication device or a Wi-Fi communication device. However, other communication systems providing other communication areas are envisioned as falling within the scope of the present disclosure. One of skill in the art will recognize that the use of BLE communication devices for communication between beacon device 232 and user devices 150 may be utilized to provide for low power communication in the background of user devices 150 (e.g., when user devices 150 are not being actively used by users).

Beacon device 232, in an embodiment, is configured to create a communication area 244 with its second communication system. Communication area 244 provides coverage for an area of interest, such as an area in the vicinity of beacon device 232 or an area in which users may view media programs on display device 140. The second communication system provides a communication area 244 with a predetermined range or radius. As can be seen in the illustrated embodiment, beacon device 232 may be positioned centrally in physical room location 200 such that the communication area 244 provide coverage for an area covering most of physical room location 200. The range of the communication area 244 may be capable of adjustment by the user to take into account the room size or the seating location in a room. For further accuracy in detecting user devices present in physical room location 200, more than one beacon device 232 may be placed in various configurations within and around physical room location 200 with different communication area 244 such that the communications areas abut, overlap, or otherwise provide coverage for any area of interest within and around physical room location 200.

Figure 3:
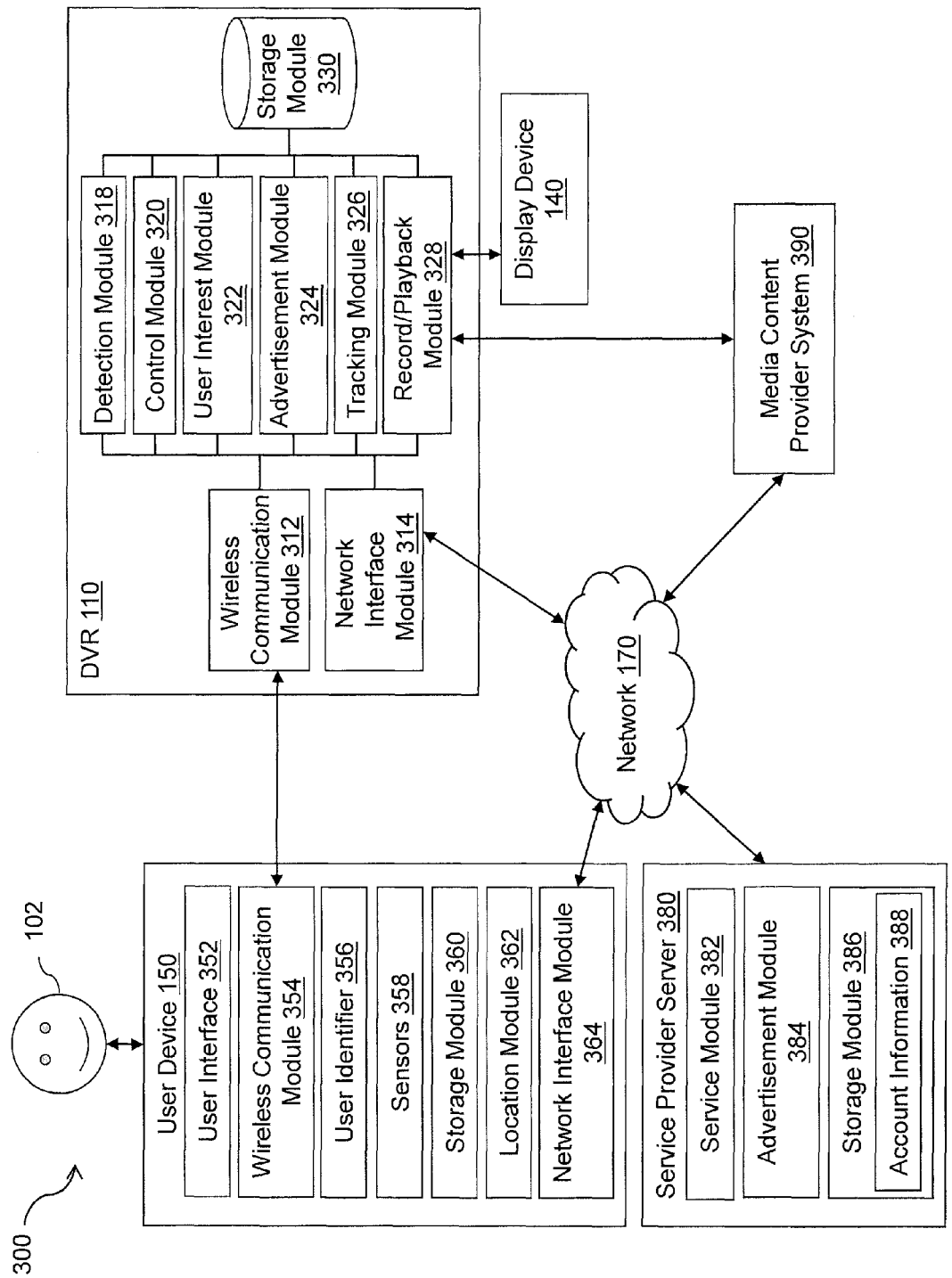
FIG. 3 is a block diagram illustrating a networked system according to an embodiment of the present disclosure.

Referring now to FIG. 3, an embodiment of a network-based system 300 for implementing one or more processes described in the present disclosure is illustrated. As shown, network-based system 300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 300 illustrated in FIG. 3 includes DVR 110, display device 140 (e.g., a TV, smart TV, monitor, etc.), one or more user devices 150 (e.g., a mobile phone, a smartphone, a wearable device, etc.), one or more service provider servers or devices 380 (e.g., network server devices), and one or more media content provider systems 390 in communication over network 170. Network 170, in one embodiment, may be implemented as a single network or a combination of multiple networks. For example, in various embodiments, network 170 may include the Internet and/or one or more intranets, landline networks, wireless networks, and/or other appropriate types of communication networks. In another example, network 170 may comprise a wireless telecommunications network (e.g., cellular phone network) adapted to communicate with other communication networks, such as the Internet. As such, in various embodiments, DVR 110, user device 150, service provider server or device 380, and media content provider system 390 may be associated with a particular link (e.g., a link, such as a URL (Uniform Resource Locator) to an IP (Internet Protocol) address).

User devices 150, in various embodiments, may be implemented using any appropriate combination of hardware and/or software configured for wired and/or wireless communication over network 170. In various embodiments, user devices 150 may include at least one of a smartphone, wireless cellular phone, satellite phone, tablet (e.g., iPad™ from Apple®), laptop computer, notebook computer, hybrid/convertible computer, personal computer (PC), and/or other types of mobile computing devices. In other embodiments, user devices 150 may include at least one wearable device, such as an activity tracker (e.g., Flex™ from Fitbit®, UP24™ from Jawbone®, FuelBand™ by Nike®), which may also be called a fitness tracker and/or health tracker, smartwatch (e.g., Galaxy Gear™ from Samsung®, Pebble Steel™ from Pebble®), eyeglasses with appropriate computer hardware resources (e.g., Google Glass™ from Google®), and/or other types of wearable computing devices. User devices 150 may include a user interface application 352, a wireless communication module 354, one or more user identifiers 356, one or more sensors 358, a storage module 360, a location module 362, a network interface module 364, and other modules.

In various implementations, user 102 is able to input data and information into an input component (e.g., a touchscreen, a keyboard, a microphone, etc.) of user device 150 to provide personal information, user interest information, user identification information, and other user data or information.

User interface application 352, in an embodiment, may be utilized by user 102 to access applications, view data or information on a display, and transmit and receive data or information to and from service provider server 380 over network 170. In one aspect, user 102 may login to an account related to user 102 via user interface application 352. In one implementation, user interface application 352 comprises a software program, such as a graphical user interface (GUI), executable by a processor that is configured to interface and communicate with service provider server 380 via network 170. In another implementation, user interface application 352 comprises a browser module that provides a network interface to browse information available over network 170. For example, user interface application 352 may be implemented, in part, as a web browser to view information available over network 170.

User device 150, in various embodiments, may include other applications as may be desired in one or more embodiments of the present disclosure to provide additional features available to user 102. In one example, such other applications may include security applications for implementing client-side security features, programmatic client applications for interfacing with appropriate application programming interfaces (APIs) over network 170, and/or various other types of generally known programs and/or software applications. In still other examples, the other applications may interface with user interface application 352 for improved efficiency and convenience.

Wireless communication module 354, in an embodiment, is configured to communicate with other devices using, for example, Bluetooth communications, Bluetooth® Low Energy (BLE) communications, NFC, Wi-Fi, and/or a variety of other communications known in the art. User device 150 may communicate with DVR 110 by wireless communication module 354 of user device 150 exchanging data packets with wireless communication module 312 of DVR 110.

User identifier 356, in an embodiment, may be implemented, for example, as operating system registry entries, cookies associated with user interface application 352, identifiers associated with hardware of user device 150, or various other appropriate identifiers. User identifier 356 may include one or more attributes related to user 102, such as personal information related to user 102 (e.g., one or more user names, passwords, photograph images, biometric IDs, addresses, phone numbers, social security number, etc.), banking information, financial information, and/or funding sources (e.g., one or more banking institutions, credit card issuers, user account numbers, security data and information, etc.). In various embodiments, data indicating user identifier 356 (e.g., user identifier data packets) may be transmitted from user device 150 (e.g., via wireless communication module 354) to DVR 110 (e.g., via wireless communication module 312). In other embodiments, data indicating user identifier 356 that includes a user login request (e.g., user login data packets) may be sent to service provider server 380 via network 170, and service provider server 380 may use user login data to associate user 102 with a particular user account maintained by service provider server 380.

Sensors 358, in various embodiments, measures one or more personal metrics, for example, by tracking, monitoring, detecting, quantifying, capturing, and/or otherwise measuring the personal metrics. Sensors 358 generate sensor data and/or other personal metric data and/or information in response to the measurements. User device 150 may receive the sensor data from sensors 358. For example, user device 150 may receive sensor data by accessing and/or communicating with sensors 358. User device 150 may process, analyze, infer from, and/or interpret the sensor data to generate further personal metric data and/or information.

Sensors 358, in an embodiment, may comprise an accelerometer, gyroscope, heart rate sensor, blood pressure sensor, thermometer, image sensor, thermal camera and/or microphone. The accelerometer that measures acceleration and the gyroscope that measures orientation may be used together to measure movement, such as activity of user 102, and generate activity data. The heart rate sensor, blood pressure sensor, and/or thermometer may be used to measure vital signs (heart rate, breathing/respiratory rate, temperature, and blood pressure) of user 102 and generate vital sign data. The heart rate sensor, blood pressure sensor, and/or thermometer may also measure changes in vital signs, vital sign trends over time, and vital sign averages over time, and generate further vital sign data. Accordingly, sensor data may include activity data and vital sign data.

Sensors 358 may be used to track activity and vitals of user 102 while user 102 is watching a media program or advertisement to collect user information, such as an interest level of user 102, reaction of user 102, excitement level of user 102, whether user 102 has fallen asleep, etc. For example, the reaction of user 102 to a scene of a media program or advertisement may be determined by tracking activity and changes in vital signs. User device 150 via sensors 358 may detect an activity (e.g., a jerking movement or other movement) and/or a change in vital signs (e.g., rise in pulse and/or temperature) during or immediately after the scene. The movement and the change in vital signs may be used as a proxy and/or a signal for user's excitement or surprise at the scene. User device 150 may transmit the sensor data indicating the movement and the change in vital signs to DVR 110 via wireless communication module 354 or service provider server 380 over network 170. DVR 110 and/or service provider server 380 may accordingly process the sensor data to generate further personal metric data or information and infer a reaction of user 102 based on the sensor data.

Storage module 360, in an embodiment, may store data and information. Storage module 360 may contain one or more databases in which to store the data and information. User device 150 may locally store personal metric data or information in a database on storage module 360. The personal metric data or information, which is based on the personal metrics measured by sensors 358, may include sensor data, the sensor data processed into data or information relating to personal metrics, personal metric history and trends over time, etc.

Location module 362, in various embodiments, determines, tracks, monitors, and/or provides an instant geographical location of user device 150. In one implementation, the geographical location may include GPS coordinates, zip-code information, area-code information, street address information, and/or various other generally known types of location data or information. In one example, location information may be directly entered into user device 150 by user 102 via a user input component, such as a keyboard, touch display, and/or voice recognition microphone. In another example, location data may be automatically obtained and/or provided by user device 150 via an internal or external monitoring component, such as global positioning system (GPS), which uses satellite-based positioning, and/or assisted GPS (A-GPS), which uses cell tower information to improve reliability and accuracy of GPS-based positioning. In other embodiments, the location data may be automatically obtained without the use of GPS. In some instances, cell signals or wireless signals are used. For example, location may be obtained by checking in using user device 150 via a check-in device at a location, such as DVR 110 in FIG. 1 (e.g., via wireless communication circuit 114) or a beacon device 232 in FIGS. 2*a* and 2*b*. This may help to save battery life and allow for better indoor location.

Network interface module 364, in various embodiments, communicates with other devices or servers over network 170. For example, user device 150 may communicate with DVR 110, service provider server 380, and media content provider system 390 via network interface module 364 exchanging data packets with a network interface module of respective device or server over network 170.

In one aspect, when interfacing with user device 150, user 102 may elect and/or consent to provide personal information, user interest data, personal metric data, location data, and/or other user data or information to service provider server 380 and/or media content provider system 390. User 102 may set or configure the user settings/configuration menu of user interface application 352 of user device 150. Through the user settings/configuration menu, user 102 may provide consent to share user data or information and the extent of shared user data or information. User device 150 may transmit shared user data or information dynamically by push synchronization, periodically, or each time an application associated with service provider server 380 or media content provider system 390 is opened by user 102. In some embodiments, user 102 may be prompted for permission to release user data or information. Accordingly, user 102 may have exclusive authority to allow transmission of personal information, user interest data, personal metric data, and/or location data from the user device 150 to service provider server 380 and/or media content provider system 390.

User device 150, in various embodiments, transmits user data or information to another user device (e.g., a PC or laptop), service provider server 380, and/or media content provider system 390 via network interface module 364. For example, user device 150 may transmit personal metric data to the other user device, service provider server 380, and/or media content provider system 390. The other user device, service provider server 380, and/or media content provider system 390 further processes, analyzes, infers from, and/or interprets personal metrics data to generate additional personal metric data or information. The other user device, service provider server 380, and/or media content provider system 390 can store a personal metric history including long-term personal metric information for user 102 that is compiled over time, and personal metric trends based on the personal metric history. In another example, user device 150 transmits location data to the other user device, service provider server 380, and/or media content provider system 390 while user is watching a media program. The other user device, service provider server 380, and/or media content provider system 390 determines where user 102 is watching the media program, such as at home, in a certain room at home, at a home of another user, at a hotel, etc.

At least one of one or more user devices 150 may be, in various embodiments, a wearable device that may be utilized by user 102 to interact with other user devices by local wireless communications, such as Bluetooth low energy (i.e., Bluetooth Smart®), wireless local area network (WLAN), Wi-Fi, near field communications (NFC), etc., or by wired communications, such as by a wired Universal Serial Bus (USB) connection. The wearable device may communicate with service provider server 380, and/or media content provider system 390 over network 170 via the other user device. For example, the wearable device may transmit personal metric data and/or location data to the other user device by wireless syncing via Bluetooth Smart®. The other user device may in turn provide personal metric data to service provider server 380, and/or media content provider system 390.

One or more media content provider systems 390, in various embodiments, may be maintained by broadcasting service providers or other media content providers (or, in some cases, by a partner of the media content providers that provide media programs on behalf of the media content providers). Examples of media content providers include public broadcast television network provider, cable television network provider, satellite television network provider, internet streaming media provider, and other media content providers. Media content providers may broadcast by transmitting digital or analogue signal via cable wires, satellite communication, network 170, or other wired or wireless communications. Broadcast signals 192 from TV, cable, or satellite network providers may be received by DVR 110 through tuner 116 in FIG. 1, and broadcast signals from internet streaming media providers may be received by DVR 110 through network interface circuit 126 and communication link 128 in FIG. 1.

Service provider server 380, in various embodiments, may provide services relating to media programs provided by media content providers and/or payment-related services. For example, service provider server 380 may be maintained by a media content provider, a service provider affiliated with a media content provider, or a service provider unaffiliated with a media content provider. In another example, service provider server 380 may be maintained by a payment service provider such as PayPal®, Inc. (an eBay® company) of San Jose, Calif., USA, and/or one or more financial institutions or a respective intermediary that may facilitate transaction routings between, for example, users 102, media content providers, merchants, and financial institutions. Service provider server 380 may be configured to interact with user device 150 over network 170 to facilitate searching for media programs and media program schedule, selection and purchase of media programs, and payment by user 102 to media content providers for media programs. Service provider server 380 includes a service module 382, an advertisement module 384, and a storage module 386, which may contain user account information 388 in a database.

Service provider server 380, in one embodiment, may be configured to maintain one or more user accounts in database on storage module 386, each of which may include user account information 388 associated with one or more individual users (e.g., user 102). User account information 388 may include data or information relating to user interests (e.g., user's interests in media programs), personal metrics (e.g., user's personal metrics data measured by user device 150) and/or location (e.g., location data based on a communication between user device 150 and DVR 110, or determined by location module 362 of user device 150). User account information 388 may also include private financial information of user 102, such as one or more account numbers, passwords, credit card information, banking information, or other types of financial information, which may be used to facilitate financial transactions between user 102 and one or more media content providers associated with media content provider system 390. In various aspects, the methods and systems described herein may be modified to accommodate users and/or media content providers that may or may not be associated with at least one existing user account and/or media content provider account, respectively.

Service provider server 380, in various embodiments, may receive user interest data, watch history data, sensor data, or other user data or information from DVR 110 in communication with user device 150 over network 170. For example, service provider server 380 may receive user input data indicating user interests from user device 150, and stores user interest data as user account information 388.

In another example, service provider server 380 receives watch history data indicating what programs user 102 has watched or is watching from DVR 110 based on DVR 110 detecting user device 150 of user 102. Service provider server 380 stores the watch history data as user account information 388 and may also track the user's watch history by updating and maintaining the watch history data in response to receiving further watch history data from DVR 110. Service provider server 380 predicts or otherwise determines user interests based on the watch history data to generate user interest data.

In a further example, service provider server 380 receives sensor data while user 102 is watching a media program or advertisement based on DVR 110 receiving sensor data from user device 150, and may determine a reaction or excitement of user 102 in response to a scene of the media program or advertisement. Service provider server 380 may use the response information inferred from the sensor data to further determine what media programs or advertisements user 102 is interested in and store user interest data as user account information 388.

Service module 382, in various embodiments, suggests or otherwise recommends media programs that user 102 may be interested in. Service module 382 accesses user account information 388 for the user interest data and determines potential media programs of interest based on the user interest data. Service module 382 may transmit user interest data indicating the media program recommendations to DVR 110. Alternatively, or in addition, service module 382 may transmit user interest data indicating the media programs to media content provider system 390 such that media content provider system 390 may provide the targeted media program recommendations to user 102.

Advertisement module 384, in various embodiments, provides advertisements that user 102 may be interested in. Advertisement module 384 accesses user account information 388 for the user interest data and determines potential advertisements of interest based on the user interest data. Advertisement module 384 may transmit targeted advertisement to DVR 110. Alternatively, or in addition, advertisement module 384 may transmit user interest data indicating targeted advertisements to media content provider system 390 such that media content provider system 390 may provide the targeted advertisements to user 102.

In one implementation, user 102 may have identity attributes stored with service provider server 380, and user 102 may have credentials to authenticate or verify identity with service provider server 380. User attributes may include personal information, banking information and/or funding sources. In various aspects, the user attributes may be passed to service provider server 380 as part of a login, search, selection, purchase, and/or payment request, and the user attributes may be utilized by service provider server 380 to associate user 102 with one or more particular user accounts maintained by the service provider server 380.

DVR 110, in various embodiments, includes a network interface module 314 that is coupled to network 170 and a wireless communication module 312 configured to be coupled to user device 150 via wireless communication module 354. Network interface module 314 and wireless communication module 312 may be coupled to any or all of a detection module 318, a control module 320, a user interest module 322, an advertisement module 324, a tracking module 326, and a record/playback module 328, any of which may be coupled to a storage module 330. Any or all of the modules may be implemented as a subsystem of DVR 110 including a circuit, a hardware component, a hardware subcomponent, and/or a variety of other subsystems known in the art. For example, any or all of the modules 312, 314, 318, 320, 322, 324, 326, 328, and 330 may be implemented using any or all of the hardware components described in FIG. 1. Furthermore, any or all of the modules may be preconfigured to perform their disclosed functionality, or may be configured by a processing system "on-the-fly" or as needed to perform their disclosed functionality. As such, any or all of the modules may include pre-configured and dedicated circuits and/or hardware components, or may be circuits and/or hardware components that are configured as needed.

For example, any or all of the modules may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules to perform the functions described below. As such, in some embodiments, preconfigured and dedicated circuits may be implemented to perform the functions of the modules. In other embodiments, a processing system may execute instructions on a non-transitory, computer-readable medium to configure one or more circuits as needed to perform the functions of the modules.

Wireless communication module 312 may be included as a separate module provided in DVR 110 or may be provided using instructions stored on a computer-readable medium that, when executed by a processing system in DVR 110, configure wireless communication module 312 to detect user device 150 and exchange data packets and information with user device 150, as well as provide any of the other functionality that is discussed below. In an embodiment, wireless communication module 312 may be implemented as wireless communication circuit 114 in FIG. 1. Network interface module 314 may be included as a separate module provided in DVR 110 or may be provided using instructions stored on a computer-readable medium that, when executed by a processing system in DVR 110, configure network interface module 312 to send and receive information over the network 170, as well as provide any of the other functionality that is discussed below. In an embodiment, network communication module 314 may be implemented as network interface circuit 126 in FIG. 1.

Detection module 318 may be included as a separate module provided in DVR 110, or may be provided using instructions stored on a computer-readable medium that, when executed by a processing system in DVR 110, configure detection module 318 to detect when one or more user devices are within a predetermined vicinity, as well as provide any of the other functionality that is discussed below. Control module 320 may be included as a separate module provided in DVR 110, or may be provided using instructions stored on a computer-readable medium that, when executed by a processing system in DVR 110, configure control module to identify interested users for a media program, track a watch status associated with the media program, determine all the interested users completed watching the media program, delete a media file for the media program, as well as provide any of the other functionality that is discussed below.

User interest module 322 may be included as a separate module provided in DVR 110, or may be provided using instructions stored on a computer-readable medium that, when executed by a processing system in DVR 110, configure control module to determine an association between a media program and interested users based on user input or user watch history, as well as provide any of the other functionality that is discussed below. Advertisement module 324 may be included as a separate module provided in DVR 110, or may be provided using instructions stored on a computer-readable medium that, when executed by a processing system in DVR 110, configure advertisement module 324 to determine targeted advertisements based on user data and/or information, as well as provide any of the other functionality that is discussed below. Tracking module 326 may be included as a separate module provided in DVR 110, or may be provided using instructions stored on a computer-readable medium that, when executed by a processing system in DVR 110, configure tracking module 326 to track activity and vital signs of user using sensor data received from user device 150, as well as provide any of the other functionality that is discussed below.

Record/playback module 328 may be included as a separate module provided in DVR 110, or may be provided using instructions stored on a computer-readable medium that, when executed by a processing system in DVR 110, configure record/playback module 328 to record media program signals as media program files on storage module 330 and play media programs on display device 140, as well as provide any of the other functionality that is discussed below. When recording a media program, record/playback module 328 may convert media program signals received from media content provider system 390 into a media program file and store the media program file. When playing back a media program, record/playback module 328 may convert a media program file to media program signals and transmit the signals to display device 140. Record/playback module 328 may include or operate tuner 116 and A/V interface 118 in FIG. 1.

Other modules discussed below but not illustrated in FIG. 3 may be provided as separate modules on DVR 110, or using instructions stored on a computer-readable medium similarly as discussed above. While storage module 330 has been illustrated as located in DVR 110, one of skill in the art will recognize that it may include multiple storage modules and may be connected to other modules through network 170 without departing from the scope of the present disclosure. In an embodiment, storage module 330 may be implemented as storage drive 130 in FIG. 1.

Figure 4:
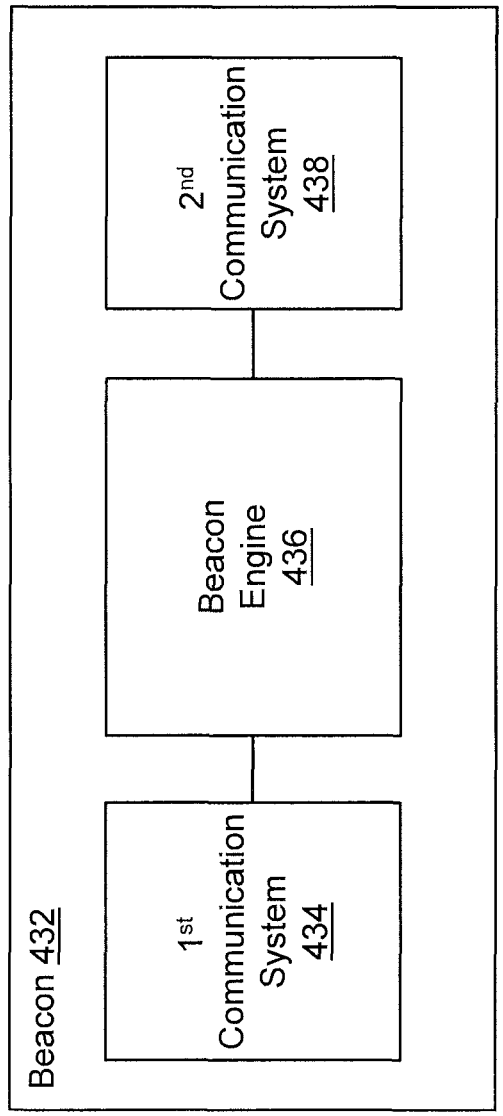
FIG. 4 is a block diagram illustrating a beacon device according to an embodiment of the present disclosure.

Referring now to FIG. 4, an embodiment of a beacon device 432 is illustrated. Beacon device 432 includes a chassis that houses a first communication system 434 such as, for example, a Wi-Fi communication system. First communication system 434 is coupled to a beacon engine 436 that may be provided by instructions on a memory system (not illustrated) in beacon device 432 that, when executed by a processing system (not illustrated) in beacon device 432, causes the processing system to perform the functions of beacon devices 432 discussed above. Beacon engine 436 is coupled to a second communication system 438 such as, for example, a Bluetooth communication system, a Bluetooth® Low Energy (BLE) communication system, a near field communication (NFC) system, a Wi-Fi communication system, an IrDA communication system, and/or a variety of other communication systems known in the art.

While a few examples of communication components in beacon device 432 have been described, one of skill in the art will recognize that other communication devices, as well as other components that have been omitted for clarity of discussion and illustrated, may be included in beacon device 432 and will fall within the scope of the present disclosure. One of skill in the art will recognize that the components described above allow for beacon device 432 to be provided in a relatively small form factor such that it may be placed inconspicuously almost anywhere. The chassis of beacon device 432 may include any of a variety of features that allow for the coupling of beacon device 432 to different areas in a physical room location, such as physical room location 200, discussed above.

Figure 5:
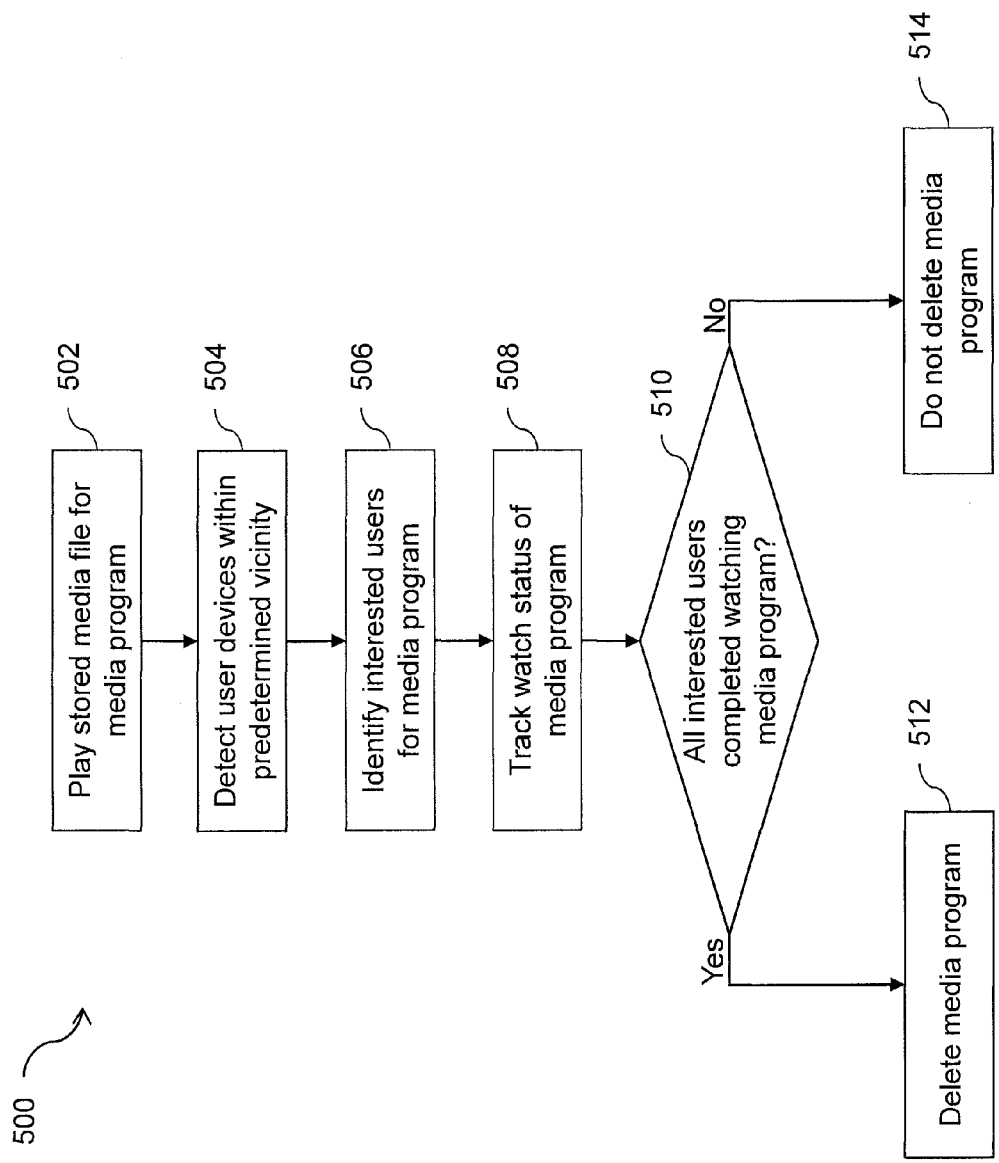
FIG. 5 is a flowchart showing a method for deleting a stored media file for a media program based on detecting user devices according to an embodiment of the present disclosure.

Referring now to FIG. 5, a flowchart of a method 500 for deleting a stored media file for a media program based on detecting user devices 150 is illustrated according to an embodiment of the present disclosure.

At block 502, DVR 110 plays a stored media file for a media program. In an embodiment, DVR 110 stores a media file for a media program on storage module 330. User 102 then uses DVR 110 to play media program on display device 140.

At block 504, DVR 110 detects user devices 150 within a predetermined vicinity or within viewing distance from display device 140. In an embodiment, wireless communication module 312 of DVR 110 and/or beacon device 232 receives identifier data packets from one or more user devices 150. The identifier data packets may include one or more user identifiers (e.g., user identifier 356) that identify user 102, user device 150, a user account associated with user 102, and/or a user account associated with user device 150. Detection module 318 is configured to communicate with wireless communication module 312 and/or beacon device 232. In response to wireless communication module 312 and/or beacon device 232 receiving the identifier data packets, detection module 318 determines that one or more user devices 150 are within a predetermined vicinity (e.g., communication area 240 or 244) while display device 140 is playing the media program.

At block 506, DVR 110 identifies interested users for the media program. In an embodiment, control module 320 accesses user interest data stored in a database on a hardware memory. The hardware memory may be in DVR 110 (e.g., storage module 330 or a separate hardware memory in DVR 110), user device 150 (e.g., storage module 360), and/or service provider server 380 (e.g., storage module 386 maintained by service provider 380). User interest data may indicate which programs each user 102 is interested in, and interested users for a media program (i.e., users 102 who are interested in the media program).

At block 508, DVR 110 tracks a watch status of media program. In an embodiment, control module 320 is configured to communicate with detection module 318. In response to detection module 318 detecting user devices 150, control module 320 tracks a watch status associated with the media program by storing and updating watch status data on the hardware memory. The watch status data includes data relating to the state of watched media program, for example, a record of which of the interested users have watched a part of the media program, which of the interested users have completed watching the media program, and/or which of the users are currently watching the media program.

At block 510, DVR 110 determines whether all interested users have completed watching the media program. In an embodiment, control module 320 determines whether all of the interested users have completed watching the media program by accessing the watch status on the hardware memory.

At block 512, DVR 110 may delete the media file for the media program when all interested users have completed watching the media program. In an embodiment, control module 320 decides to delete the media file based on whether all of the interested users have completed watching the media program. In other embodiments, control module 320 may perform the determination step in block 510 and deletion step in block 512 only when there is less than a predetermined amount of free storage space on storage module 330. Accordingly, control module 320 decides to delete the media file further based on the amount of space available on storage module 330.

In further embodiments, control module 320 decides to delete the media file for the media program further based on interest level in the media program. Control module 320 may gauge the interest level of interested users who have not completed watching the media program, and delete the media file based on the interest level. Control module 320 may further gauge the interest level of users 102 in a future media program soon to be broadcasted and compare the interest level in the recorded media program and the future media program, and delete the recorded media program based on a comparison of interest levels. For example, if the media program is an episode in a series, and an interested user is known to never skip watching the episodes, control module 320 may decide not to delete the media file. In another example, if a user is interested in the episodes but is known to have skipped a few episodes in the past, and there are future media programs that users 102 are more interested in, control module 320 may decide to delete the media file.

In certain embodiments, DVR 110 deletes the media file only after notifying user 102 and receiving a confirmation from user 102 to delete the media file. In another embodiment, DVR 110 deletes the media file automatically without notifying user 102 and/or requiring a confirmation from user 102. In further embodiments, user 102 may set or configure the user settings/configuration menu and select whether DVR 110 notifies user 102 to delete or deletes automatically.

At block 514, DVR 110 does not delete the media file for the media program when not all of the interested users have completed watching the media program. In an embodiment, control module 320 decides not to delete the media file when not all of the users have completed watching the media program and/or there is more than a predetermined amount of space available on storage module 330.

Figure 6:
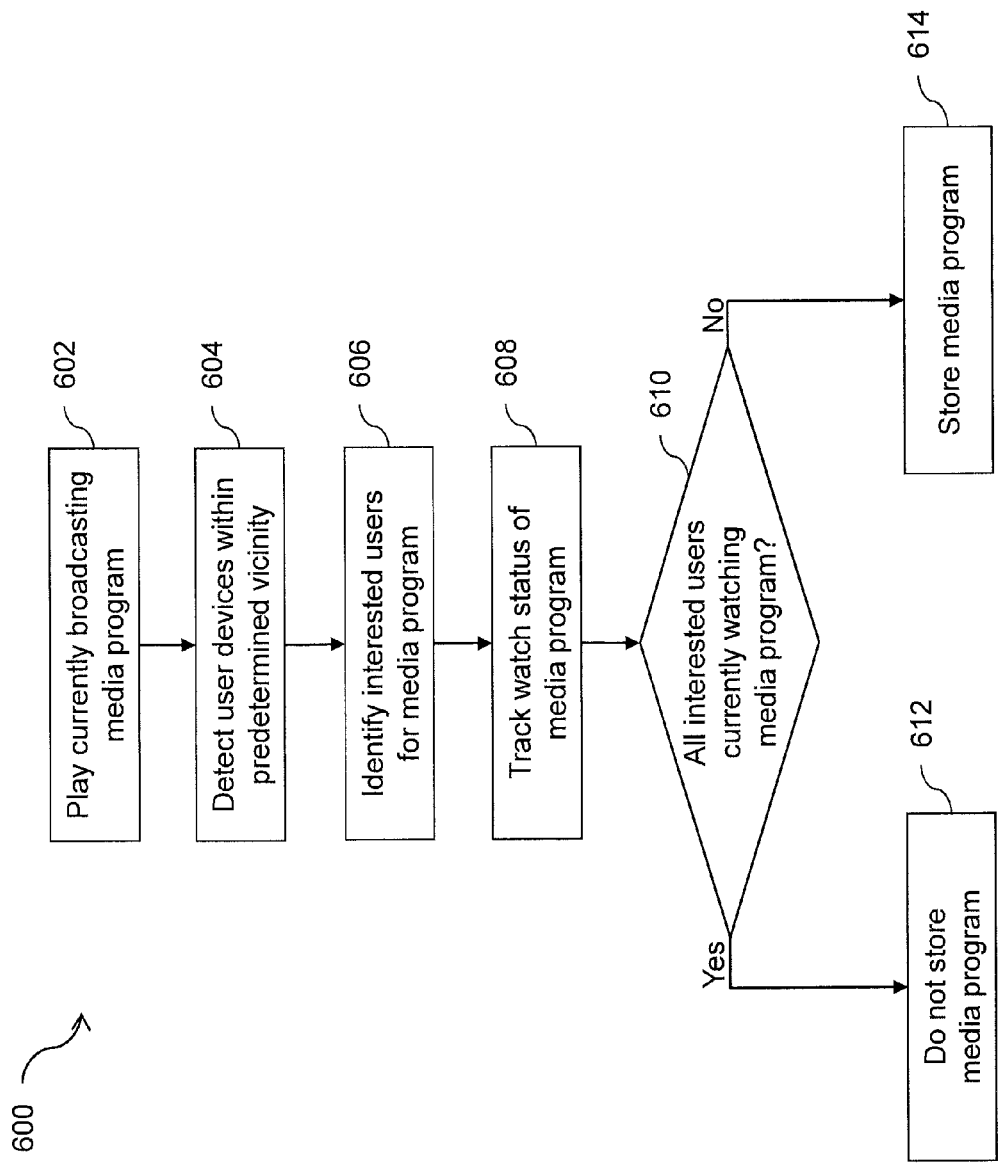
FIG. 6 is a flowchart showing a method for storing a broadcasting media program based on detecting user devices according to an embodiment of the present disclosure.

Referring now to FIG. 6, a flowchart of a method 600 for storing a broadcasting media program based on detecting user devices 150 is illustrated according to an embodiment of the present disclosure.

At block 602, DVR 110 plays a currently broadcasting media program. In an embodiment, DVR 110 is ready to store the currently broadcasting media program as a media file in storage device 330, but will only store the media file if some interested users are not presently watching the media program.

At block 604, DVR 110 detects user devices 150 within a predetermined vicinity or within viewing distance from display device 140, as described above in block 504.

At block 606, DVR 110 identifies interested users for the media program, as described above in block 506.

At block 608, DVR 110 tracks a watch status of media program, as described above in block 508.

At block 610, DVR 110 determines whether all interested users are currently watching the media program. In an embodiment, control module 320 determines whether all of the interested users are currently watching the media program by accessing the detection module 318 and/or the watch status on the hardware memory.

At block 612, DVR 110 may store the media file for the media program when not all of the interested users are watching the media program while the media program is being broadcast. In an embodiment, control module 320 decides to store the media file based on whether all of the interested users are watching the media program when it is being broadcast and/or the amount of available storage space on storage module 330. In a further embodiment, control module 320 may decide to store the media file based on watch history data of interested users. For example, control module 320 may decide to store the media file when the watch history data indicates that one or more of the interested users have watched a similar or related media program more than one time, such that one or more of the interested users may want to watch the media program again in the future.

At block 614, DVR 110 may not store the media program when all of the interested users are watching the media program when the media program is being broadcast. In an embodiment, control module 320 decides not to store the media file for the media program when not all of the interested users are watching the media program while it is being broadcast and/or there is less than a predetermined amount of space available on storage module 330.

Figure 7:
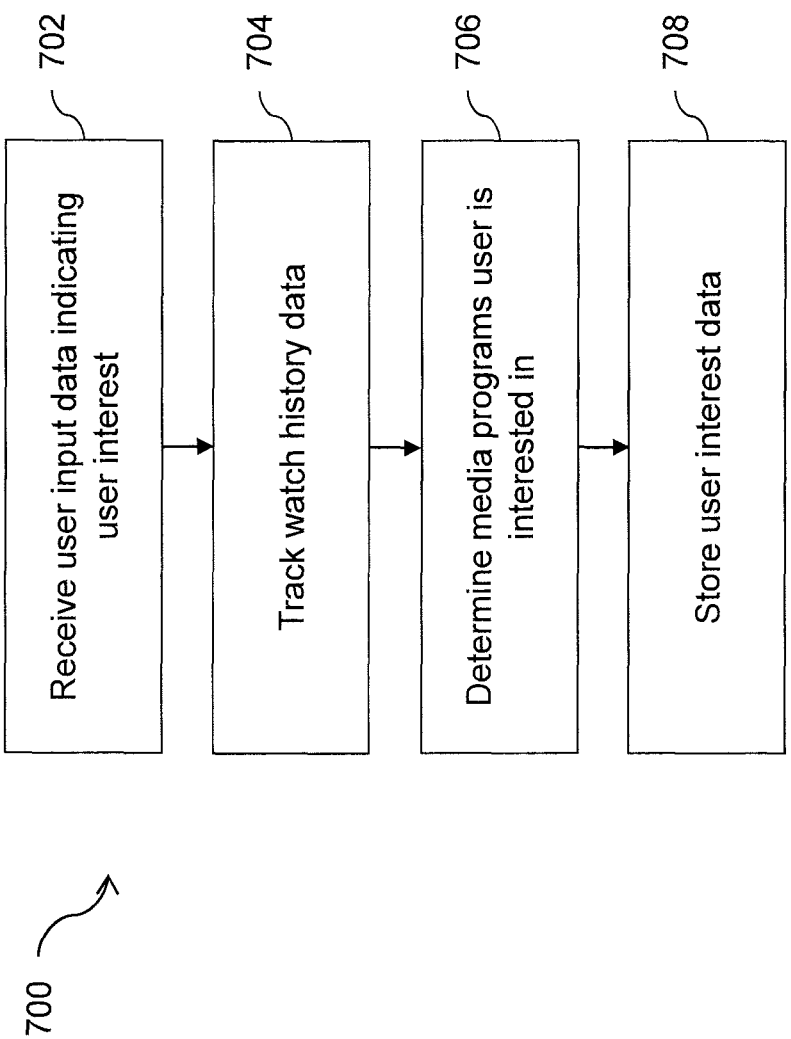
FIG. 7 is a flowchart showing a method for creating and maintaining a user interest database indicating programs that one or more users are interested in according to an embodiment of the present disclosure.

Referring now to FIG. 7, a flowchart of a method 700 for or creating and maintaining a user interest database is illustrated according to an embodiment of the present disclosure.

At block 702, DVR 110 and/or service provider server 380 receives user input data indicating user interest, which includes what programs user 102 is interested in. In an embodiment, user 102 registers what programs he or she is interested in by inputting on user interface 112 of DVR 110. DVR 110 (e.g., using user interest module 322) may store the user input data in a user interest database in a hardware memory (e.g., storage module 330 or other hardware memory). In another embodiment, user 102 inputs on user device 150 information regarding what programs user 102 is interested in. User device 150 transmits user input data to DVR 110 via wireless communication module 354 or to service provider server 380 via network interface module 364 over network 170. DVR 110 (e.g., using user interest module 322) may receive user input data via wireless communication module 312 and store the user input data in a user interest database in a hardware memory (e.g., storage module 330 or other hardware memory). Service provider server 380 (e.g., using service module 382) may receive user input data and store user input data in a hardware memory (e.g., storage module 386).

At block 704, DVR 110 and/or service provider server 380 tracks a watch history data. In an embodiment, DVR 110 (e.g., using user interest module 322) tracks what media programs user 102 has watched using detection module 318, which detects user devices 150. DVR 110 may store the tracked data as watch history data in user interest database in the hardware memory. DVR 110 may transmit watch history data to service provider server 380 via network interface module 314 over network 170. Service provider server 380 (e.g., using service module 382) may receive the watch history data and store the watch history data in a database in the hardware memory.

At block 706, DVR 110 (e.g., using user interest module 322) and/or service provider server 380 (e.g., using service module 382) determines media programs user 102 is interested in based on the user input data and the watch history data. For example, user 102 may register a media program series (e.g., TV series) as media programs of interest on DVR 110 via user input 112. Based on the user input data, DVR 110 determines that user 102 is interested in each episode, or each future episode, of that media program series. Further, the watch history data of user 102 may indicate that user 102 regularly watches episodes of a media program series. Based on the watch history data, DVR 110 determines that user is interested in each episode, or each future episode, of that media program series based on the watch history data.

DVR 110 may then associate user 102 with the media program series and/or each episode, or each future episode, of the media program series. DVR 110 may further determine that user 102 may be interested in similar or related media programs (e.g., based on genre, actor, director, producer, etc.).

At block 708, user interest data is stored in a database. In an embodiment, DVR 110 (e.g., using user interest module 322) and/or service provider server 380 (e.g., using service module 382) stores the association between user 102 and the media programs he or she is interested in as user interest data. In some embodiments, service provider server 380 may receive user interest data from DVR 110 in place of, or in addition to, receiving user input data from user device 150 and/or the watch history data from DVR 110.

Figure 8:
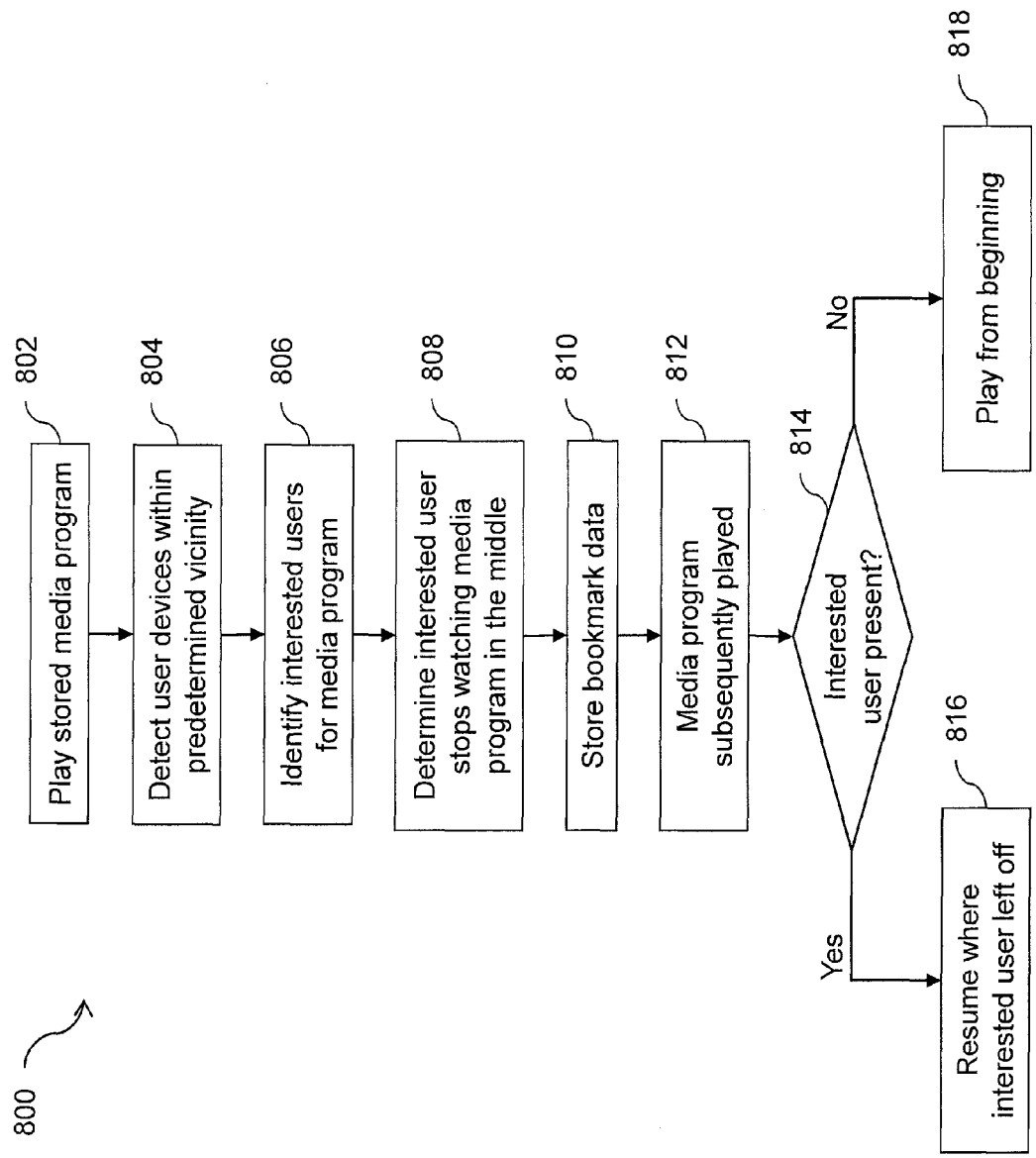
FIG. 8 is a flowchart showing a method for resuming a media program where a user previously left off based on detecting user devices according to an embodiment of the present disclosure.

Referring now to FIG. 8, a flowchart of a method 800 for resuming a media program where a user previously left off based on detecting user devices 150 is illustrated according to an embodiment of the present disclosure.

At block 802, DVR 110 plays a stored media program or a currently broadcasting media program.

At block 804, DVR 110 detects user devices 150 within a predetermined vicinity or within viewing distance from display device 140, as described above in block 504.

At block 806, DVR 110 identifies interested users for the media program, as described above in block 506.

At block 808, DVR 110 determines that an interested user stops watching the media program before the end of the media program based on the DVR 110 no longer detecting user device 150 of the interested user. In an embodiment, control module 320 determines that the interested user stopped watching the media program before the end of the media program in response to detection module 318 no longer detecting user device 150 of the interested user, such as when wireless communication module 312 loses connectivity with user device 150.

At block 810, DVR stores bookmark data associated with the media program indicating where the interested user left off in a hardware memory. In various embodiments, the hardware memory may be on DVR 110 (e.g., storage module 330 or), on user device 150 (e.g., storage module 360), and/or service provider server 380 (e.g., storage module 386). In embodiments in which the bookmark data is stored on user device 150 or service provider server 380, when the interested user is within a predetermined vicinity of another DVR 110 (e.g., DVR 110 in another room or at a home of other users 102), the bookmark data may be transmitted to the other DVR 110.

At block 814, DVR 110 receives input to play the media program associated with the bookmark.

At block 816, DVR 110 determines whether the interested user is present based on the DVR 110 detecting user device 150 of the interested user. In an embodiment, when the media program is subsequently played, control module 320 determines that the interested user is present in response to detection module 318 detecting user device 150 of the interested user.

At block 818, if the interested user is present, the media program is resumed where the interested user last left off.

At block 814, if the interested user is not present, the media program is played from the beginning.

Figure 9:
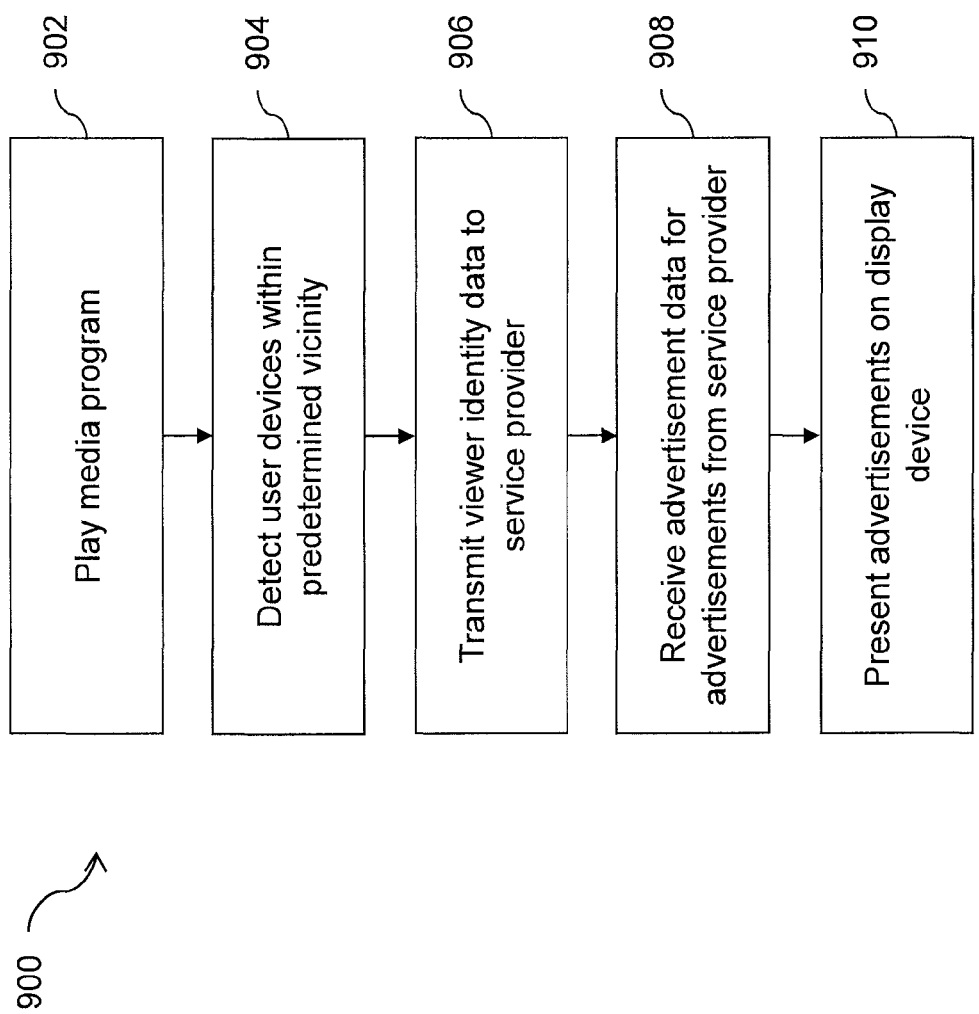
FIG. 9 is a flowchart showing a method for presenting advertisements based on detecting user devices according to an embodiment of the present disclosure.

Referring now to FIG. 9, a flowchart of a method 900 for presenting advertisements based on detecting user devices 150 is illustrated according to an embodiment of the present disclosure.

At block 902, DVR 110 plays a stored media program or a currently broadcasting media program.

At block 904, DVR 110 detects user devices 150 within a predetermined vicinity or within viewing distance from display device 140, as described above in block 504.

At block 906, DVR 110 transmits viewer identity data to service provider server 380 and/or media content provider system 390. In an embodiment, DVR 110 (e.g., using advertisement module 324) transmits viewer identity data, which may include one or more user identifiers (e.g., user identifier 356) that identify user 102, user device 150, a user account associated with user 102, and/or a user account associated with user device 150.

At block 908, DVR 110 receives advertisement data from service provider server 380 and/or media content provider system 390. In an embodiment, service provider server 380 and/or media content provider system 390 receives the viewer identity data from DVR 110 over network 170. Based on the viewer identity data, service provider server 906 and/or media content provider system 390 identifies which users 102 are currently watching television programs or other media programs on display device 140. Service provider server 380 (e.g., using advertisement module 384) and/or media content provider system 390 selects advertisement taking into account the viewer identity as indicated by viewer identity data, and transmits advertising data to DVR 110. Accordingly, service provider server 380 may provide customized/personalized selection of advertisements depending on viewership in real-time. Advertisements may be targeted based on DVR 110/user device 150 connection to provide more relevant and appropriate advertisements.

At block 910, DVR 110 presents advertisement on display device 140.

Figure 10:
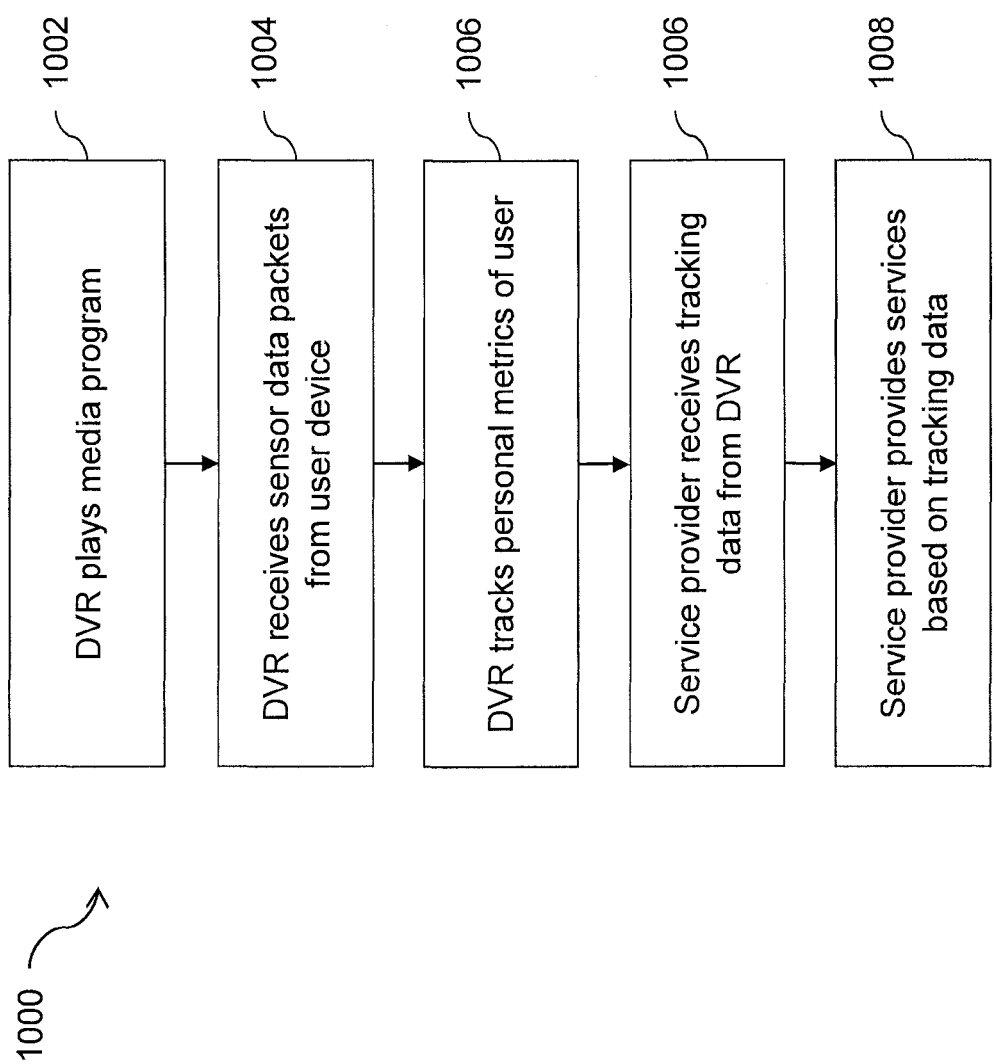
FIG. 10 is a flowchart showing a method for tracking activity of a user based on sensor data from a wearable device of the user according to an embodiment of the present disclosure.

Referring now to FIG. 10, a flowchart of a method 1000 for tracking activity of a user based on sensor data from a wearable device of the user is illustrated according to an embodiment of the present disclosure.

At block 1002, DVR 110 plays a stored media program or a currently broadcasting media program.

At block 1004, DVR 110 receives sensor data packets from user device 150, which may be a wearable device. In an embodiment, sensors 358 of user device 150 measure activity, vital signs, or other personal metrics. Wireless communication module 312 of DVR 110 receives sensor data packets from user device 150.

At block 1006, DVR 110 tracks activity, vital signs, and other personal metrics of user 102 based on sensor data packets while user 102 is watching the media program. In an embodiment, in response to DVR 110 (e.g., via wireless communication module 312) receiving the sensor data over time, DVR 110 (e.g., using tracking module 326) tracks personal metrics of user 102 by and storing tracking data. Tracking data may include data indicating activity, changes in activity, average activity, vital signs, changes in vital signs, average vital signs, and/or other personal metrics, trends, and averages. DVR 110 may process and/or analyze sensor data for further data and information.

At block 1008, DVR 110 may transmit tracking data to service provider server 380.

At block 1010, service provider server 380 may provide services based on the tracking data. In an embodiment, service provider server 380 may recommend or suggest other media programs based on the sensor data from user device 150. For example, service provider server 380 may determine that user 102 is excited by certain types of scenes or content of the media program, and suggest other media programs with similar scenes or content. In another example, service provider server 380 may determine that user 102 is stressed when he or she views certain types of scenes or content (e.g., violence or gore), and avoid suggesting other media programs with similar scenes or content.

In another embodiment, service provider server 380 may provide offers based on the sensor data from user device 150. For example, service provider server 380 may determine interests based on sensor data from user device 150 and provide offers for movies, attractions, events, or products based on such interests. For example, service provider server 380 may determine that user 102 likes action because sensor data suggests excitement (e.g., increased heart rate and/or temperature, increased activity level) when watching action scenes, and provide offers for action movies and/or active events (e.g., paintballing, skydiving, amusement park rides etc.). The interests may be broad (e.g., interest in action vs. drama) or more specific (e.g., interest in a specific sport, specific sports team, specific actor, specific product, etc.). In an example, service provider server 380 may determine that user 102 is excited when watching a certain sports team play, and provide offers for sporting events for that team and products relating to that team.

Figure 11:
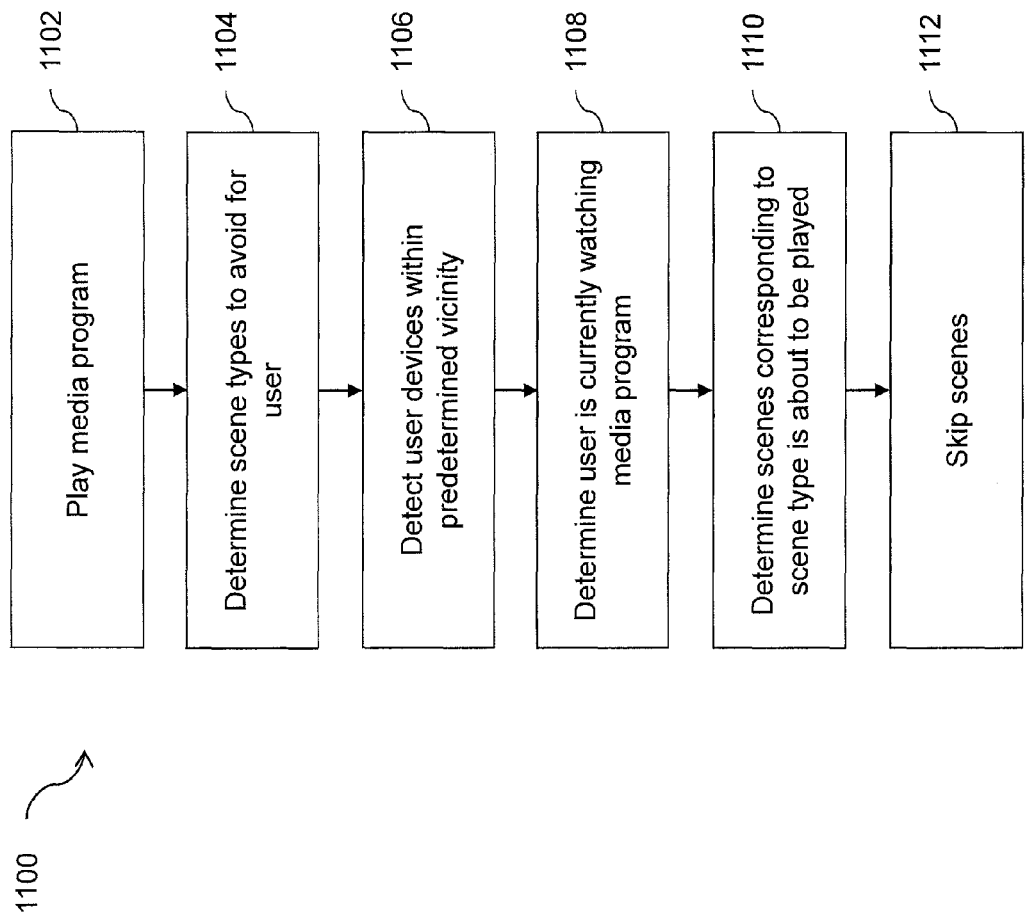
FIG. 11 is a flowchart showing a method for skipping scenes corresponding to scene types to avoid for a user based on detecting user devices according to an embodiment of the present disclosure.

Referring now to FIG. 11, a flowchart of a method 1100 for skipping scenes corresponding to scene types to avoid for a user based on detecting user devices 150 is illustrated according to an embodiment of the present disclosure.

At block 1102, DVR 110 plays a stored media program or a currently broadcasting media program.

At block 1104, DVR 110 determines one or more scene types to avoid for user 102 by accessing user information data, e.g., user restriction data, in a hardware memory. In an embodiment, control module 320 accesses user information data in a hardware memory on DVR 110 (e.g., storage module 330), user device 150 (e.g., storage module 360), and/or service provider server 380 (storage module 386). User information data may indicate scene types to avoid (e.g., violence, sexually explicit content, substance abuse, profanity, etc.) based on user provided input data and/or user age. For example, user information data may indicate an age group of user 102 (e.g., under 13, between 14 and 17, 18 and older, etc.).

At block 1106, DVR 110 detects user devices 150 within a predetermined vicinity or within viewing distance from display device 140, as described above in block 504.

At block 1108, DVR 110 determines whether user 102 is currently watching media program based on the detected user devices in block 1106. In an embodiment, control module 320 determines that user 102 is currently watching the media program based on detection module 318 detecting user devices 150 (e.g., via wireless communication module 312).

At block 1110, DVR 110 determines that scenes corresponding to at least one of the scene types to avoid for user 102 is about to be played or is being played. In an embodiment, service provider server 380 maintains a database of filter files, each associated with a media program, in a database on storage module 386. The filter files contain data indicating where in the media program that possible scene types to avoid are located (e.g., frames containing the possible scene types to avoid). DVR 110 accesses and/or receives a filter file for the media program that is being played. Using the data contained in the filter file, DVR 110 determines that scenes corresponding to the scene types to avoid for user 102 is about to be played. In other embodiments, the media program is currently being broadcast, and DVR 110 buffers the media program by storing buffered data in a hardware memory (e.g., storage module 330 or other hardware memory) so that DVR 110 may determine the scenes corresponding to the scene types to avoid for user 102 before the actual scene is shown.

At block 1112, DVR 110 skips the scenes responding to the scene types.

Figure 12:
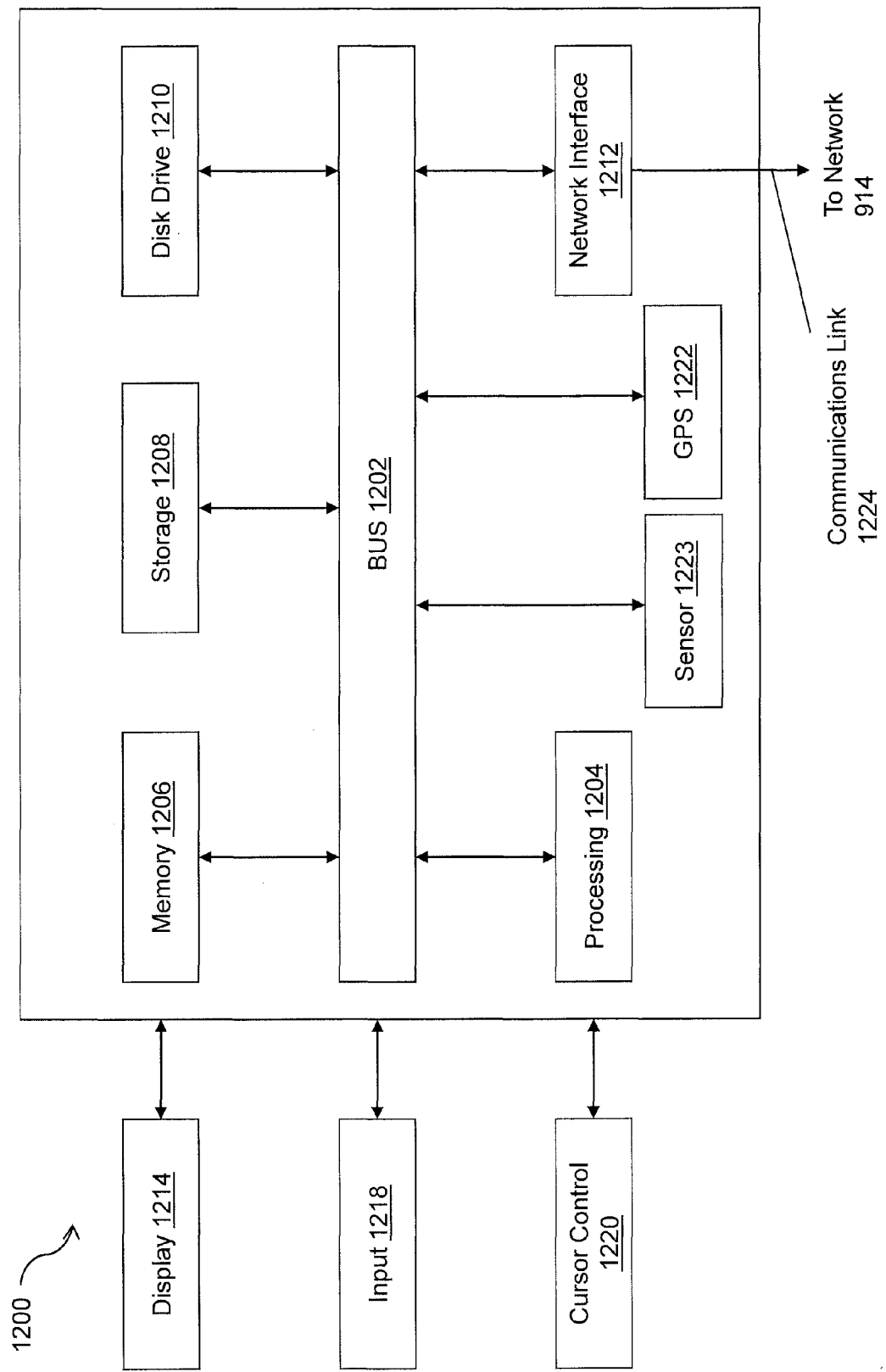
FIG. 12 is a block diagram of a system for implementing one or more components in FIG. 3 according to an embodiment of the present disclosure.

Referring now to FIG. 12, an embodiment of a computer system 1200 suitable for implementing, for example, the DVR, beacon device, display device, user devices, service provider server, and broadcasting service provider server is illustrated. It should be appreciated that other devices utilized by users, service providers, and/or broadcasting service providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), a location determination component 1222 (e.g., a Global Positioning System (GPS) device as illustrated, a cell tower triangulation device, and/or a variety of other location determination devices known in the art), and/or a sensor component 1223. In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the DVR, beacon device, display device, user devices, service provider server, and broadcasting service provider server. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 914 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

In view of the present disclosure, it will be appreciated that various devices, systems, and methods have been described according to one or more embodiments for detecting user devices to determine a state of a watched show.

Although various components and steps have been described herein as being associated with DVR 110, display device 140, one or more user devices 150, service provider server 380, media content provider system 390 of FIGS. 1 and 3, it is contemplated that the various aspects of such devices and servers illustrated in FIGS. 1 and 3 may be distributed among a plurality of servers, devices, and/or other entities.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, the description focused on a DVR determining and then automatically performing various actions related to recording, storing, and/or deleting media programs. Other aspects include the DVR or a system notifying or getting confirmation from the user before performing an action, such as deleting a media program. Thus, the present disclosure is limited only by the claims.

What is claimed is:

1. A digital video recorder (DVR) system, comprising:
a storage drive configured to store media files;
a wireless communication module configured to receive identifier data packets and biometric sensor data from a plurality of user devices associated with a plurality of users;
a non-transitory memory; and
one or more hardware processors coupled to the non-transitory memory and configured to read instructions from the non-transitory memory to cause the system to perform operations comprising:

monitoring, via the wireless communication module, biometric sensor data from the plurality of user devices during a presentation of a first media program;

inferring, for each user in the plurality of users, a viewer reaction to the first media program based on the monitored biometric sensor data related to the user;

determining, from the plurality of users, a group of interested users who are interested in a second media program based at least in part on the inferred viewer reactions of the plurality of users;

detecting, via the wireless communication module, one or more user devices within a predetermined vicinity while the second media program is playing on a display device;

in response to determining that at least one interested user from the group of interested users is not watching the second media program while the second media program is being broadcast based on the detecting, initially generating and storing a second media file for the second media program in the storage drive while the second media program is being broadcast;

tracking a watch status for the second media program indicating how much of the second media program each interested user in the group of interested users has watched based on the detecting; and in response to determining that all of the interested users within the group of interested users have completed watching the media program based on the tracking, automatically deleting the second media file from the storage drive without providing a notification.

2. The system of claim 1, wherein the tracking of the watch status comprises storing watch status data, wherein the watch status data comprises a record of which interested users in the group of interested users have watched a part of the media program, which interested users in the group of interested users have completed watching the media program, which interested users in the group of interested users are currently watching the media program, or a combination thereof.

3. The system of claim 1, wherein the operations further comprise:
    determining that at least one interested user within the group of interested users has not completed watching the second media program by accessing the watch status data; and
    deleting the second media file automatically without providing a notification based on a viewing history of the at least one interested user.

4. The system of claim 1, wherein the determining of the group of interested users is further based on user interest data associated with the plurality of users.

5. The system of claim 1, wherein the determining of the group of interested users is further based on user input, user watch history, or both.

6. The system of claim 1, wherein the operations further comprise:
    in response to detecting, via the wireless communication module, that a user device of an interested user is no longer within the predetermined vicinity while the second media program is playing on the display device, storing bookmark data indicating where the interested user stopped watching in the second media program;

in response to the second media program being subsequently played and detecting, via the wireless communication module, that the user device of the interested user is within the predetermined vicinity, determining where the user stopped watching by accessing the bookmark data; and
    resuming the second media program where the user stopped watching.

7. The system of claim 1, wherein the operations further comprise:
    in response to the detecting of the one or more user devices, identifying one or more current viewers;
    transmitting viewer identity data indicating the one or more current viewers to a service provider server;
    receiving advertisement data for an advertisement from the service provider server, wherein the advertisement is selected based on the viewer identity data; and
    presenting the advertisement.

8. The system of claim 1, wherein
the biometric sensor data of a user comprises at least one of a heart rate, a respiratory rate, a blood pressure, or an activity level of the user, wherein the operations further comprise
providing a media program recommendation to the user based on the inferred viewer reaction of the user.

9. The system of claim 1, wherein the operations further comprise:
    in response to detecting, via the wireless communication module, that a user device of a user is within the predetermined vicinity, determining that the user is currently watching the second media program;
    identifying one or more scene types to avoid for the user based on the inferred viewer reaction of the user to the first media program;
    determining that a scene within the second media program corresponding to the one or more scene types is about to be played; and
    skipping the scene.

10. A method, comprising:
    monitoring, by one or more processors via a wireless communication module, biometric sensor data from a plurality of user devices associated with a plurality of users during a presentation of a first media program;
    inferring, by the one or more processors for each user in the plurality of users, a viewer reaction to the first media program based on the monitored biometric sensor data related to the user;
    determining, by the one or more processors, from the plurality of users a group of interested users who are interested in a second media program based at least in part on the inferred viewer reactions of the plurality of users;
    detecting, by the one or more processors via a wireless communication module, one or more user devices of one or more users is within a predetermined vicinity of a display device while the second media program is playing on the display device;
    in response to determining that at least one interested user from the group of interested users is not watching the second media program while being broadcast based on the detecting, initially recording, by the one or more processors, the second media program as a second media file while being broadcast;
    tracking, by the one or more processors, a watch status for the second media program indicating how much of the second media program each interested user in the group of interested users has watched based on the detecting; and determining, by the one or more processors, that all of the interested users in the group of interested users have completed watching the media program based on the tracking; and deleting, by the one or more processors, the second media file based, at least in part, on the determining that all of the interested users in the group of interested users have completed watching the second media program.

11. The method of claim 10, wherein the determining of the group of interested users is further based on user interest data.

12. The method of claim 10, wherein the deleting of the second media file is performed automatically without providing a notification.

13. The method of claim 10, further comprising in response to determining that all of the interested users in the group of interested users are watching the second media program during the recording of the second media program based on the detecting of the one or more user devices, stopping, by the one or more processors, the recording of the second media program.

14. The method of claim 10, wherein the determining of the group of interested users is further based on user input, user watch history, or both.

15. The method of claim 10, further comprising:
in response to detecting, via the wireless communication module, that a user device of an interested user is no longer within the predetermined vicinity before the end of the second media program, generating, by the one or more processors, bookmark data indicating where the interested user stopped watching in the second media program;
in response to subsequently playing the second media program and detecting, via the wireless communication module, that the user device is within the predetermined vicinity, resuming, by the one or more processors, the second media program where the user left off.

16. The method of claim 10, further comprising:
transmitting, by the one or more processors over a network through a network interface to a service provider server, viewer identity data identifying the one or more users watching the second media program; and
receiving, by the one or more processors over the network through the network interface from the service provider server, advertisement data for an advertisement, wherein the advertisement is selected based on the viewer identity data.

17. The method of claim 10, wherein
the biometric sensor data of a user comprises at least one of a heart rate, a respiratory rate, a blood pressure, or an activity level of the user, wherein the method further comprises
providing, by the one or more processors, a media program recommendation to the user based on the inferred viewer reaction of the user.

18. The method of claim 10, the method further comprising:
in response to detecting, via the wireless communication module, that a user device of a user is within the predetermined vicinity, determining, by the one or more processors, that the user is watching the second media program;
identifying, by the one or more processors, one or more scene types to avoid for the user based on the inferred viewer reaction of the user to the first media program;
determining, by the one or more processors, that a scene within the second media program corresponding to the one or more scene types is about to be played; and
skipping, by the one or more processors, the scene.

19. A non-transitory machine-readable medium having stored thereon machine-readable instructions executable to cause a machine to perform operations comprising:
monitoring, a wireless communication module, biometric sensor data from a plurality of user devices associated with a plurality of users during a presentation of a first media program;
inferring, for each user in the plurality of users, a viewer reaction to the first media program based on the monitored biometric sensor data related to the user;
detecting that one or more user devices are within a viewing distance from a display device while the display device plays a second media program in response to the wireless communication module receiving identifier data packets from the one or more user devices;
determining, from the plurality of users, a group of interested users who are interested in the second media program based at least in part on the inferred viewer reactions of the plurality of users;
in response to determining that at least one interested user from the group of interested users is not watching the second media program currently being broadcast based on the detecting, initially generating and storing a second media file for the second media program currently being broadcast in a storage device;
tracking a watch status associated with the second media program indicating how much of the second media program each interested user in the group of interested users has watched based on the detecting;
determining that all of the interested users in the group of interested users have completed watching the media program based on the tracking; and
deleting the second media file from the storage device based, at least in part, on the determining that all of the interested users in the group of interested users have completed watching the second media program.

20. The non-transitory machine-readable medium of claim 19, wherein the deleting of the second media file is further based on an amount of free space on the storage device.

* * * * *